United States Patent
Zhou et al.

(10) Patent No.: US 11,889,327 B2
(45) Date of Patent: Jan. 30, 2024

(54) NETWORK CODING WITH DYNAMIC REDUNDANCY OVERHEAD

(71) Applicant: QUALCOMM Incorporated, San Diego, CA (US)

(72) Inventors: Shanyu Zhou, San Diego, CA (US); Arumugam Chendamarai Kannan, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/100,508

(22) Filed: Nov. 20, 2020

(65) Prior Publication Data

US 2022/0167184 A1 May 26, 2022

(51) Int. Cl.
*H04W 24/04* (2009.01)
*H04W 24/08* (2009.01)
*H04W 28/04* (2009.01)

(52) U.S. Cl.
CPC ......... *H04W 24/04* (2013.01); *H04W 24/08* (2013.01); *H04W 28/04* (2013.01)

(58) Field of Classification Search
CPC ............... H04W 4/70; H04W 74/0833; H04L 12/1868; H04L 12/18; H04L 1/1835; H04B 7/088
See application file for complete search history.

(56) References Cited

U.S. PATENT DOCUMENTS

2009/0073876 A1\* 3/2009 Kimmich ............. H04N 19/162
370/229
2009/0213916 A1\* 8/2009 Liu ........................ H04Q 11/04
375/220

(Continued)

FOREIGN PATENT DOCUMENTS

EP         2827522 A1    1/2015
WO   WO-2010117646 A1  10/2010
(Continued)

OTHER PUBLICATIONS

Chan Y-C., et al., "Adaptive Network Coding Scheme for TCP Over Wireless Sensor Networks", International Journal of Computers Communications & Control, vol. 8, No. 6, Dec. 2013 (Dec. 1, 2013), pp. 800-811, XP055261395, ISSN: 1841-9836, DOI:10.15837/ijccc. 2013.6.26, Sections 1 and 3.

(Continued)

*Primary Examiner* — Syed Ali
(74) *Attorney, Agent, or Firm* — Holland & Hart LLP

(57) ABSTRACT

Methods, systems, and devices for wireless communications are described. In some wireless communications systems, a base station may transmit sets of network coding encoded packets user equipments (UEs), and each set of network coding encoded packets may be associated with a redundancy overhead. The base station may dynamically identify the redundancy overhead for transmitting sets of network coding encoded packets to each UE based on a failure rate associated with a previous transmission of network coding encoded packets to that UE. For example, the base station may determine a failure rate associated with a transmission of a first set of network coding encoded packets and may identify a redundancy overhead associated with one or more second sets of network coding encoded packets based on the determined failure rate. In some cases, the base station may identify different redundancy overheads for transmissions of network coding encoded packets to different UEs.

28 Claims, 17 Drawing Sheets

(56) References Cited

U.S. PATENT DOCUMENTS

| | | | |
|---|---|---|---|
| 2009/0327842 A1* | 12/2009 | Liu | H04N 19/164 714/776 |
| 2012/0011398 A1* | 1/2012 | Eckhardt | H04L 1/0041 |
| 2016/0205586 A1* | 7/2016 | Kim | H04L 1/0011 370/230 |
| 2016/0261367 A1* | 9/2016 | Lee | H04L 12/18 |
| 2017/0127448 A1* | 5/2017 | Zhou | H04W 28/04 |
| 2020/0374960 A1* | 11/2020 | Deenoo | H04W 76/19 |
| 2021/0266124 A1* | 8/2021 | Wu | H04W 74/08 |
| 2021/0266786 A1* | 8/2021 | Dudda | H04L 43/10 |

FOREIGN PATENT DOCUMENTS

| | | |
|---|---|---|
| WO | WO-2014074757 A2 | 5/2014 |
| WO | WO-2017088919 A1 | 6/2017 |

OTHER PUBLICATIONS

International Search Report and Written Opinion—PCT/US2021/055823—ISA/EPO—dated Feb. 1, 2022.

* cited by examiner

NETWORK CODING WITH DYNAMIC REDUNDANCY OVERHEAD

FIELD OF TECHNOLOGY

The following relates to wireless communications, including network coding with dynamic redundancy overhead.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support network coding with dynamic redundancy overhead. Generally, the described techniques provide for a base station to use a redundancy overhead for transmitting sets of network coding encoded packets based on a channel quality associated with the transmission. That is, a base station may transmit a set of network coding encoded packets to a user equipment (UE) and determine a failure rate associated with that transmission. For example, the base station may identify the failure rate based on receiving, from the UE, feedback (e.g., hybrid automatic repeat request (HARQ) negative acknowledgement (NACK) feedback), a retransmission request (e.g., a radio link control (RLC) status report message), or an indication of the failure rate. After determining the failure rate, the base station may identify a redundancy overhead for future transmissions of sets of network coding encoded packets to the UE based on the determined failure rate. The base station may then transmit additional sets of network coding encoded packets using the identified redundancy overhead. In cases that the base station is in communication with multiple UEs, the base station may identify different redundancy overhead for communications with each UE based on a failure rate associated with transmissions to each respective UE.

DETAILED DESCRIPTION

Figure 1:
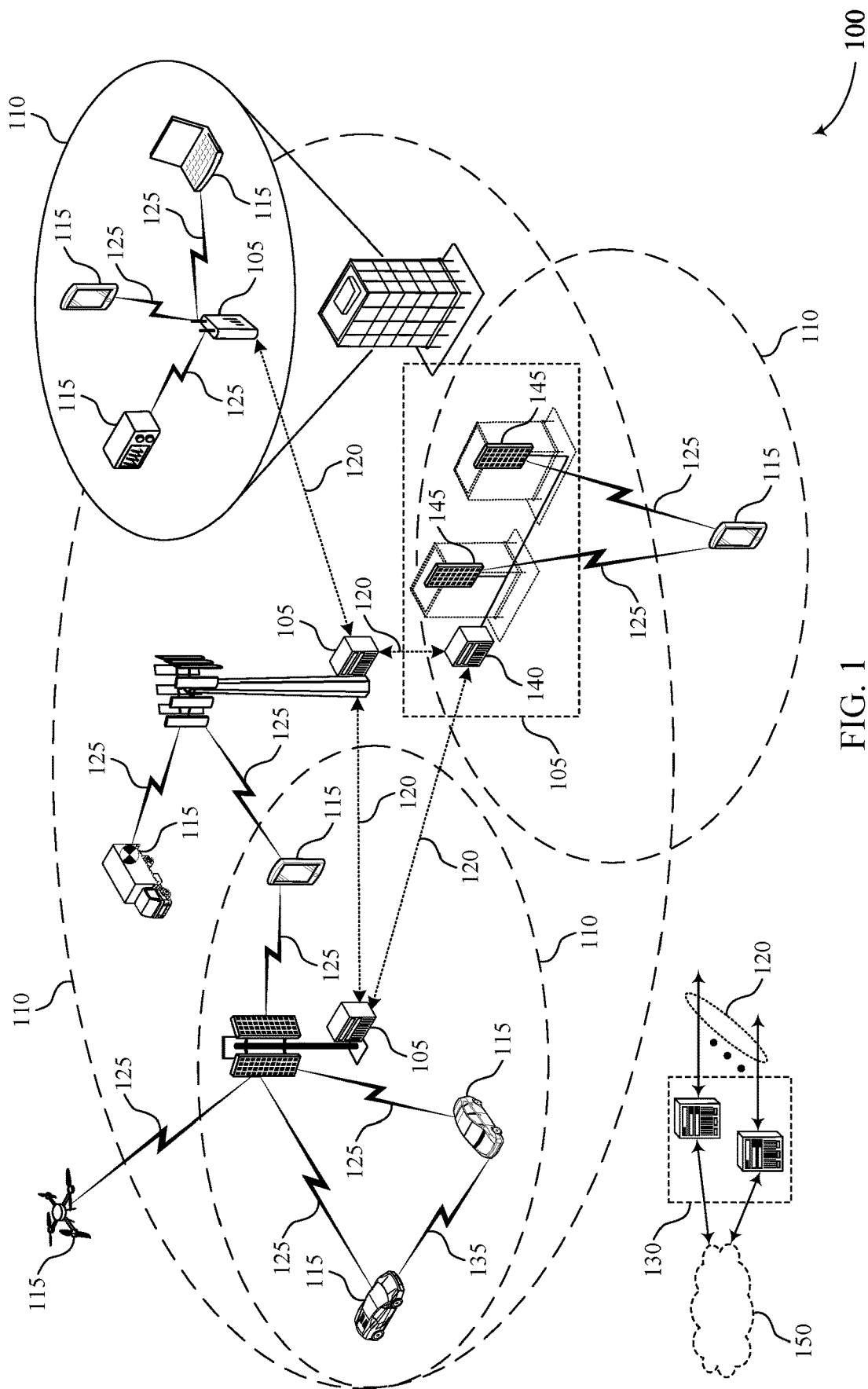
FIG. 1 illustrates an example of a wireless communications system that supports network coding with dynamic redundancy overhead in accordance with aspects of the present disclosure.

In some wireless communication systems, a base station (or other transmitting device such as a user equipment (UE) or an integrated access and backhaul (IAB) node) may perform network coding of radio link control (RLC) layer packets. The network coding may be used to encode a first number of packets of an RLC service data unit (SDU) into a second number of packets of an RLC protocol data unit (PDU) that may then be transmitted (e.g., following medium access control (MAC) and physical (PHY) layer processing) to a UE (or other receiving device). The UE may decode the RLC PDU using network coding techniques, which may allow for recovery of one or more missing packets.

In some cases, the base station may transmit a set of network coding encoded packets (e.g., of the RLC PDU) with an associated redundancy overhead. That is, a portion of the set of network coding encoded packets may include redundant data. In some cases, this may enable the UE to decode the set of network coding encoded packets even in cases of one or more missing packets. In some systems, the base station may be in communication with multiple UEs and may utilize a same redundancy overhead for unicast transmissions to each of the UEs. However, a quantity of redundant network coding encoded packets (e.g., a redundancy overhead) necessary to achieve reliable communications with a UE may be based on a channel quality associated with that UE. For example, in cases that a channel quality associated with communications between a base station and a UE is relatively high, the UE may be able to successfully receive the set of network coding encoded packets having a relatively low redundancy overhead. Additionally, in cases that the channel quality associated with communications between the base station and the UE is relatively low (e.g., resulting in a higher failure rate), the UE may rely on a higher redundancy overhead to successfully recover one or more missing packets. Therefore, utilizing a same redundancy overhead for unicast transmissions to UEs that may not have similar channel qualities may result in excessive redundancy overhead or insufficient redundancy overhead for transmissions with some UEs.

In the example of wireless communication systems as disclosed herein, a base station may use a dynamic redundancy overhead for unicast transmissions to different UEs. This may enable the base station to decrease unnecessary overhead for transmissions with UEs associated with higher channel qualities while still maintaining reliable communications with UEs associated with lower channel qualities. For example, the base station may determine a failure rate associated with a transmission to each UE and the base station may identify a redundancy overhead for transmissions with each UE based on the identified failure rate. The redundancy overhead updates may be base station-initiated or UE-initiated (e.g., the base station may update the redundancy overhead based on receiving a request for the updated redundancy overhead from the UE). In one case, the redundancy overhead updates may be based on a periodicity for redundancy overhead updates. In another case, the redundancy overhead updates may be based on the identified failure rate. That is, the base station may update the redundancy overhead in cases that the identified failure rate exceeds a threshold failure rate.

Aspects of the disclosure are initially described in the context of wireless communications systems. Aspects of the disclosure are then described in the context of process flows and Aspects of the disclosure are further illustrated by and described with reference to apparatus diagrams, system diagrams, and flowcharts that relate to network coding with dynamic redundancy overhead.

FIG. 1 illustrates an example of a wireless communications system 100 that supports network coding with dynamic redundancy overhead in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit a set of network coding encoded packets with an associated redundancy overhead. That is, a portion of the set of network coding encoded packets may include redundant data. In some cases, this may enable a receiving UE 115 to decode the set of network coding encoded packets even in cases of one or more missing packets. In some wireless communications systems 100, the base station 105 may be in communication with multiple UEs 115 and may utilize a same redundancy overhead for unicast transmissions to each of the UEs 115. However, a quantity of redundant network coding encoded packets (e.g., a redundancy overhead) necessary to achieve reliable communications with a UE 115 may be based on a channel quality associated with that UE 115. Therefore, utilizing a same redundancy overhead for unicast transmissions to UEs 115 that may not have similar channel qualities may result in excessive redundancy overhead or insufficient redundancy overhead for transmissions with some UEs 115.

In the example of wireless communications system 100, a base station 105 may use a dynamic redundancy overhead for unicast transmissions to different UEs 115. This may enable the base station 105 to decrease unnecessary overhead for transmissions with UEs 115 associated with higher channel qualities while still maintaining reliable communications with UEs 115 associated with lower channel qualities. For example, the base station 105 may determine a failure rate associated with a transmission to each UE 115 and the base station 105 may identify a redundancy overhead for transmissions with each UE 115 based on the identified failure rate. The redundancy overhead updates may be base station-initiated or UE-initiated (e.g., the base station 105 may update the redundancy overhead based on receiving a request for the updated redundancy overhead from the UE 115). In one case, the redundancy overhead updates may be based on a periodicity for redundancy overhead updates. In another case, the redundancy overhead updates may be based on the identified failure rate. That is, the base station 105 may update the redundancy overhead in cases that the identified failure rate exceeds a threshold failure rate.

Figure 2:
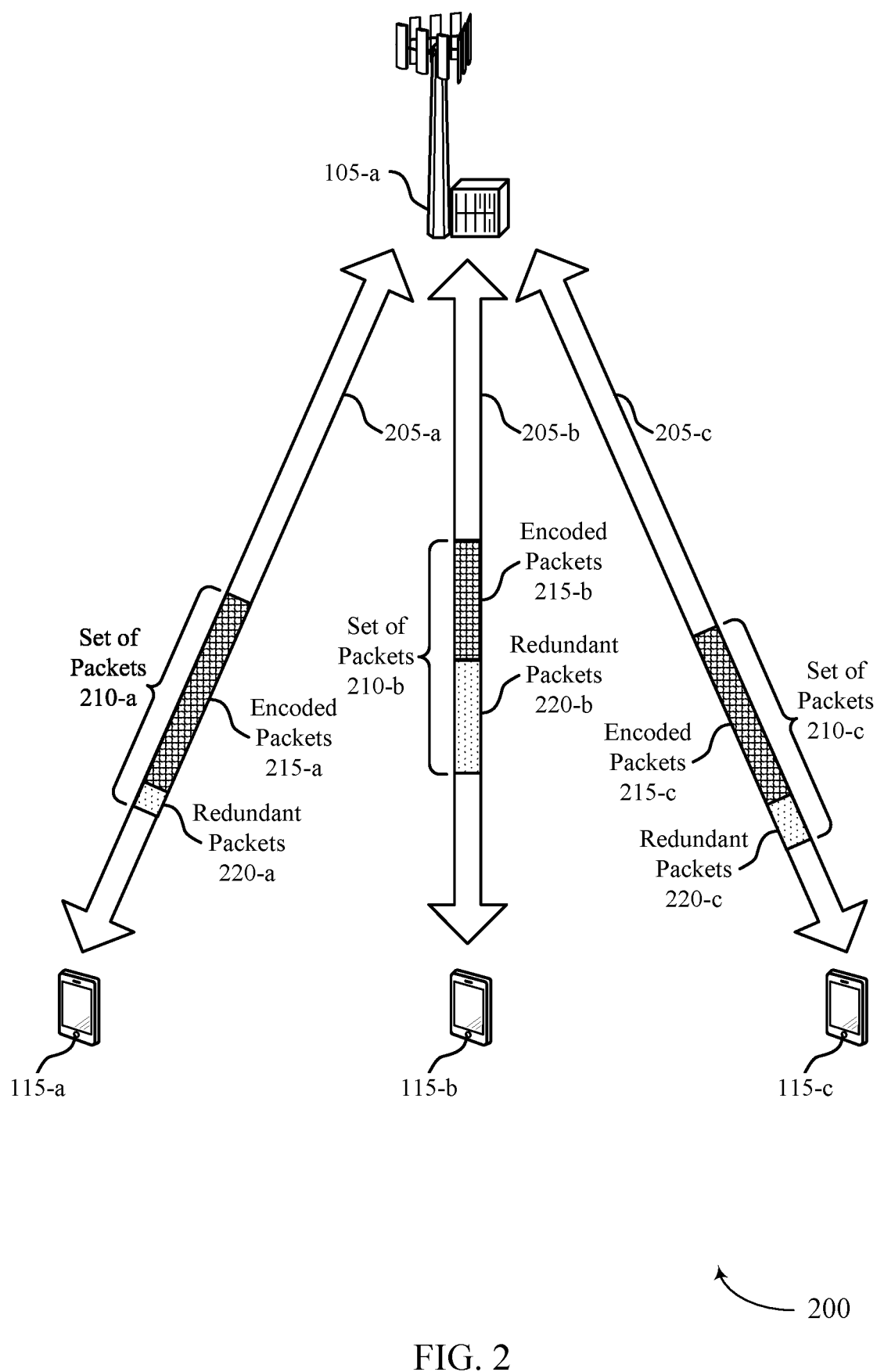
FIG. 2 illustrates an example of a wireless communications system that supports network coding with dynamic redundancy overhead in accordance with aspects of the present disclosure.

FIG. 2 illustrates an example of a wireless communications system 200 that supports network coding with dynamic redundancy overhead in accordance with aspects of the present disclosure. In some examples, the wireless communications system 200 may implement aspects of wireless communications system 100. The wireless communications system 200 may include UEs 115-a, 115-b, and 115-c and a base station 105-a, which may be examples of a UE 115 and a base station 105, respectively, as described with reference to FIG. 1.

The base station 105-a may be in communication with multiple UEs 115 including UE 115-a, UE 115-b, and UE 115-c. That is, the base station 105-a may be in communication with the UE 115-a via the channel 205-a, the UE 115-b via the channel 205-b, and the UE 115-c via the channel 205-c. The base station 105-a may use the channels 205 to transmit sets of network coding encoded packets 210 to the UEs 115. For example, the base station 105-a may transmit a unicast transmission including the set of packets 210-a to the UE 115-a via the channel 205-a. Additionally, the base station 105-a may transmit a different unicast transmission including the set of packets 210-b to the UE 115-b via the channel 205-b.

Each of the sets of packets 210 may be associated with a redundancy overhead. That is, each set of packets 210 may include one or more encoded packets 215 and one or more redundant packets 220. The one or more redundant packets 220 may enable the UE 115 to receive less than all of the packets within the set of packets 210 and still successfully receive the data within the set of packets 210. That is, a UE 115 may rely on one or more redundant packets 220 to recover one or more missing packets. In some instances, sets of packets 210 with a higher redundancy overhead (e.g., more redundant packets 220) may enable a UE 115 to recover more missing packets than sets of packets 210 with a lower redundancy overhead.

The base station 105-a may dynamically identify a redundancy overhead for the sets of packets 210 based on a quality of the channel 205 for communications with the UE 115. For example, if the base station 105-a determines that a channel 205 is associated with a relatively high channel quality, the base station 105-a may utilize a relatively low redundancy overhead (e.g., by including less redundant packets 220 within the set of packets 210). Additionally, if the base station 105-a determines that a channel 205 is associated with a relatively low channel quality, the base station 105-a may utilize a relatively high redundancy overhead (e.g., by including more redundant packets 220 within the set of packets 210).

In the example of wireless communications system 200, the base station 105-a may utilize a relatively low redundancy overhead for transmitting the set of packets 210-a to the UE 115-a via the channel 205-a (e.g., when compared to the redundancy overheads the base station 105-a uses for transmissions to the other UEs 115). That is, the base station 105-a may determine that the channel quality of the channel 205-a is relatively high, and may therefore determine to transmit less redundant packets 220-a within the set of packets 210-a (e.g., and more encoded packets 215-a). Additionally, the base station 105-a may utilize a relatively high redundancy overhead for transmitting the set of packets 210-b to the UE 115-b via the channel 205-b. That is, the base station 105-a may determine that the channel quality of channel 205-b is relatively low (e.g., when compared to the channels 205-a and 205-c), and may therefore determine to transmit more redundant packets 220-b within the set of packets 210-b (and less encoded packets 215-b).

The base station 105-a may determine the channel quality of the channels 205 based on a failure rate associated with transmitting sets of packets 210 to the UE 115 via the channel 205. A failure rate associated with transmitting a set of packets 210 may be based on a quantity of the encoded packets 215 the UE 115 is unable to receive when monitoring the channel 205 for the set of packets 210. For example, the base station 105-a may transmit the set of packets 210-c to the UE 115-c and the failure rate associated with that transmission may be based on the number of packets within the set of packets 210 that the UE 115-c is unable to receive.

The base station 105-a may determine the failure rate based on a message received from the UE 115 (e.g., via a MAC-control element (CE), via uplink control information (UCI)). For example, a UE 115 may transmit a feedback message (e.g., a HARQ NACK message) in response to receiving a set of packets 210 and the base station 105-a may determine the failure rate based on receiving the feedback message. That is, the feedback message may indicate one or more packets within the set of packets 210 that the UE 115 was unable to receive and the base station 105-*a* may determine the failure rate based on that indication. In another example, a UE 115 may transmit a retransmission request (e.g., a radio link control (RLC) status report message) for one or more of packets within a set of packets 210 and the base station 105-*a* may determine the failure rate based on the retransmission request. In another example, the UE 115 may transmit a message indicating the failure rate itself. For example, the UE 115 may determine the failure rate and transmit a message to the base station 105-*a* indicating the determined failure rate.

The base station 105-*a* may identify a redundancy overhead for transmissions of sets of packets 210 based on the failure rate associated with a previously-transmitted set of packets 210. That is, the base station 105-*a* may transmit a first set of packets 210 to the UE 115 using a first redundancy overhead and may identify a second redundancy overhead for future transmissions of second sets of packets 210 that is based on a failure rate associated with the transmission of the first set of packets 210. Equation 1, shown below, illustrates an example equation that the base station 105-*a* may utilize to identify a redundancy overhead R to use for transmissions based on a determined failure rate, E.

$$R = \frac{1}{1-E} - 1 = \frac{E}{1-E} \quad (1)$$

Equation 2, shown below, illustrates another example equation that the base station 105-*a* may utilize to identify a redundancy overhead R to use for transmissions based on a determined failure rate, E.

$$R = \frac{d-1+E}{1-E} \quad (2)$$

In the Example of Equation 2, d may be defined according to Equation 3, shown below, where k is a quantity of sub-packets that an original packet is divided into (e.g., prior to network coding). In the example of Equation 2, d may be greater than 1 and the higher d is, the greater a likelihood that a UE may decode the transmission to successfully recover the original packet.

$$d = 1 + \frac{1}{k} \quad (3)$$

In some examples, the base station 105-*a* may identify redundancy overheads for future transmissions of sets of packets 210 according to a periodicity (e.g., every 'T' slots). In another example, the base station 105-*a* may identify redundancy overheads for future transmissions of sets of packets 210 when a failure rate of a transmission of a set of packets 210 exceeds a threshold failure rate. Additionally, the base station 105-*a* may identify redundancy overheads for future transmissions of sets of packets 210 in response to a request for an updated redundancy overhead from a UE 115.

When the base station 105-*a* identifies a redundancy overhead for transmitting a set of packets 210 to a UE 115, the base station 105-*a* may use network coding to encode the set of packets 210 according to the identified redundancy overhead. Thus, the base station 105-*a* may generate a set of packets 210 include encoded packets 215 and one or more redundant packets 220. The base station 105-*a* may then transmit one or more sets of packets 210 to the UE 115 using the identified redundancy overhead.

Figure 3:
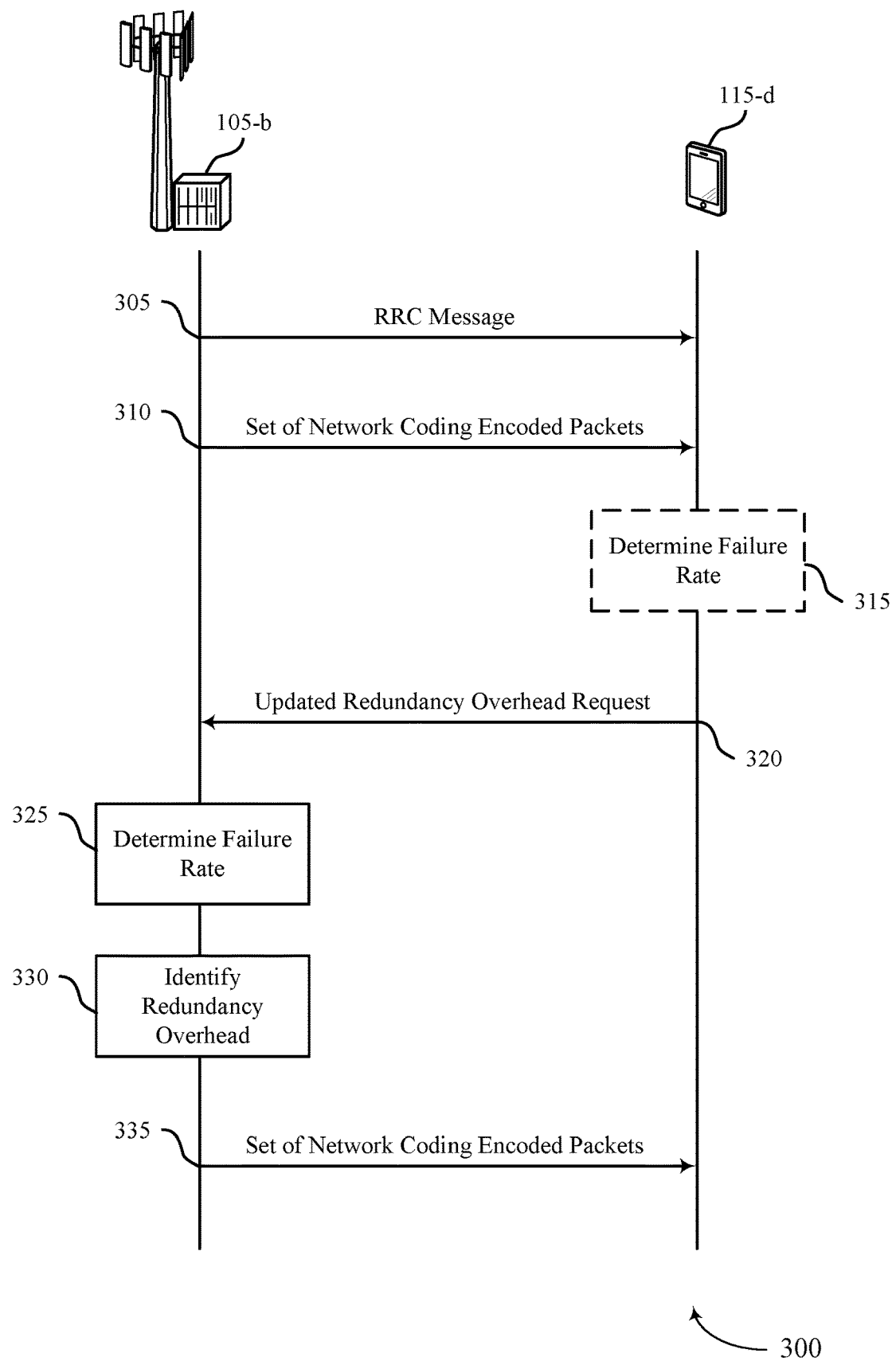
FIGS. 3 and 4 illustrate example process flows that support network coding with dynamic redundancy overhead in accordance with aspects of the present disclosure.

FIG. 3 illustrates an example of a process flow 300 that supports network coding with dynamic redundancy overhead in accordance with aspects of the present disclosure. For example, the UE 115-*d* may be an example of the UEs 115 as described with respect to FIGS. 1 and 2. Additionally, the base station 105-*b* may be an example of the base stations 105 as described with respect to FIGS. 1 and 2. In the process flow 300, the base station 105-*b* may update a redundancy overhead for transmitting sets of network coding encoded packets to the UE 115-*d* based on receiving a request from the UE 115-*d* to update the redundancy overhead.

At 305, the base station 105-*b* may transmit an RRC message to the UE 115-*d*. In some examples, the RRC message may indicate a configuration for updating the redundancy overhead for transmitting sets of network coding encoded packets. For example, the RRC message may indicate a periodicity for updating redundancy overheads or a threshold failure rate associated with updating redundancy overheads.

At 310, the base station 105-*b* may transmit, to the UE 115-*d*, a first set of network coding encoded packets including a first redundancy overhead. Additionally, the UE 115-*d* may attempt to receive the first set of network coding encoded packets based on the base station 105-*b* transmitting the set of network coding encoded packets.

At 315, the UE 115-*d* may optionally determine a failure rate associated with the set of network coding encoded packets received from the base station 105-*b* at 310. For example, the UE 115-*d* may estimate the failure rate based on the quantity of the first set of network coding encoded packets that are successfully received when attempting to receive each of the first set of network coding encoded packets. In another example, the UE 115-*d* may estimate the failure rate based on identifying a quantity of the first set of network coding encoded packets that are received via an RLC entity at the UE 115-*d*. That is, the UE 115-*d* may identify one or more empty RLC packet numbers (e.g., indicating that one or more of the first set of network coding encoded packets are not received via the RLC entity). Here, the UE 115-*d* may estimate the failure rate based on the quantity of the first set of network coding encoded packets that are received via the RLC entity.

At 320, the UE 115-*d* may transmit, to the base station 105-*b*, a request for an updated redundancy overhead for one or more second sets of network coding encoded packets. For example, the UE 115-*d* may transmit the request based on the configuration (e.g., indicated by the RRC message) for updating the redundancy overhead for transmitting sets of network coding encoded packets. That is, the UE 115-*d* may determine that the failure rate identified at 320 exceeds a threshold failure rate. In another case, the UE 115-*d* may transmit the request for the updated redundancy overhead according to the configured periodicity. The UE 115-*d* may transmit the request using a MAC-CE or UCI. In some instances, the UE 115-*d* may additionally include the determined failure rate in the request. Additionally, the request may indicate the updated redundancy overhead for the one or more second sets of network coding encoded packets.

At 325, the base station 105-*b* may determine the failure rate associated with the set of network coding encoded packets received from the base station 105-*b* at 310. For example, the base station 105-*b* may determine the failure rate based on receiving an indication of the failure rate within the updated redundancy overhead request received at 320. In another example, the base station 105-*b* may determine the failure rate based on receiving a feedback message or retransmission request from the UE 115-*d*. Additionally, the base station 105-*b* may determine the failure rate based on a combination of receiving a feedback message or retransmission request from the UE 115-*d* and receiving the indication of the failure rate from the UE 115-*d*.

At 330, the base station 105-*b* may identify a redundancy associated with one or more second sets of network coding encoded packets (e.g., based on the determined failure rate). In some cases, the base station 105-*b* may identify the redundancy overhead for the one or more second sets of network coding encoded packets based on receiving the request to update the redundancy overhead from the UE 115-*d* at 320.

At 335, the base station 105-*b* may transmit, to the UE 115-*d*, one or more second sets of network coding encoded packets having the identified redundancy overhead. That is, the base station 105-*b* may encode the one or more second sets of packets using network coding and according to the identified redundancy overhead. The base station 105-*b* may then transmit the one or more second sets of network coding encoded packets to the UE 115-*d*.

Figure 4:
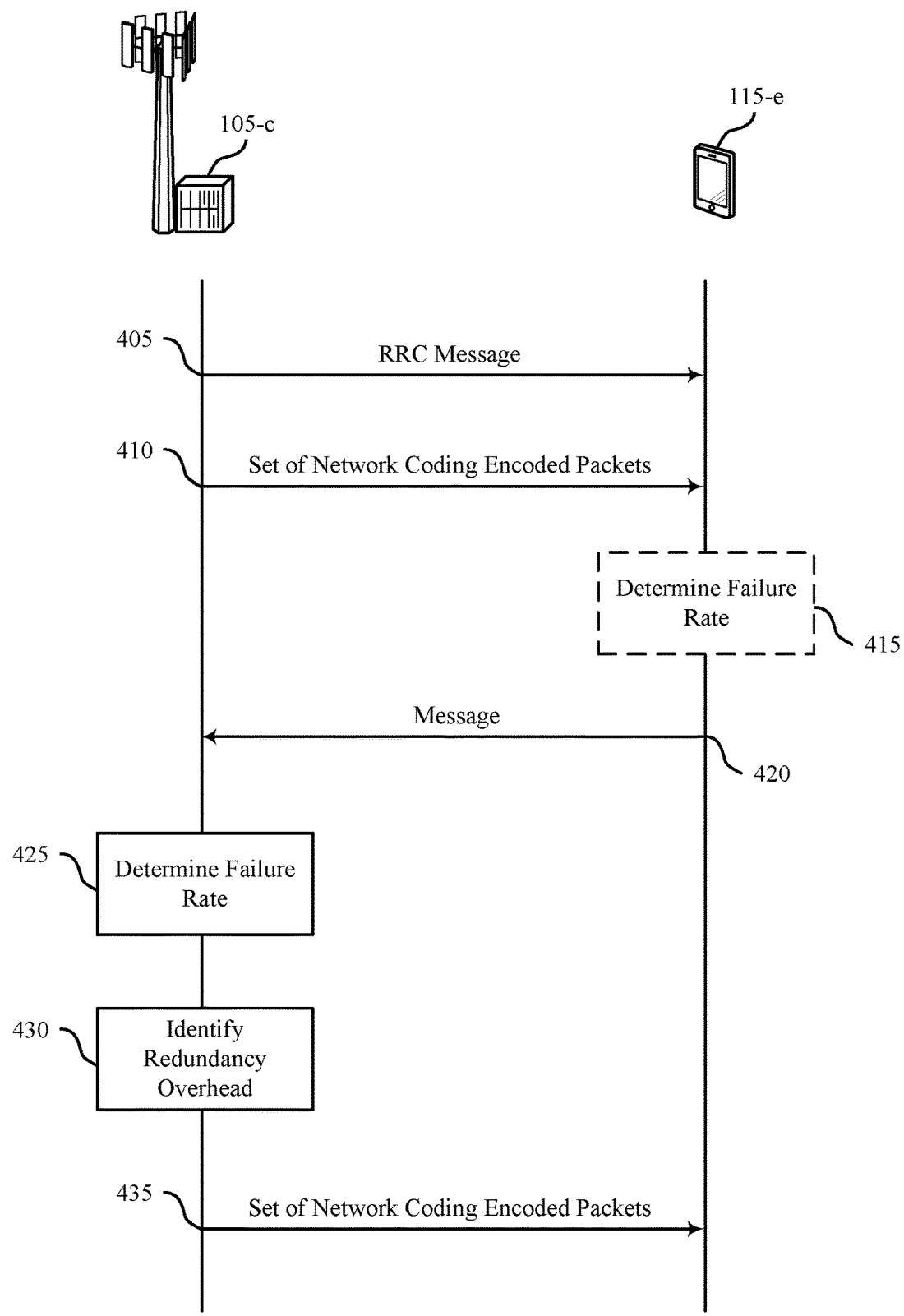

FIG. 4 illustrates an example of a process flow 400 that supports network coding with dynamic redundancy overhead in accordance with aspects of the present disclosure. For example, the UE 115-*e* may be an example of the UEs 115 as described with respect to FIGS. 1 through 3. Additionally, the base station 105-*d* may be an example of the base stations 105 as described with respect to FIGS. 1 through 3. In the process flow 400, the base station 105-*c* may determine to update a redundancy overhead for transmitting sets of network coding encoded packets to the UE 115-*e* based on a redundancy overhead update periodicity or an identified failure rate exceeding a threshold.

At 405, the base station 105-*b* may transmit an RRC message to the UE 115-*e*. In some examples, the RRC message may indicate a configuration for updating the redundancy overhead for transmitting sets of network coding encoded packets. For example, the RRC message may indicate a periodicity for updating redundancy overheads or a threshold failure rate associated with updating redundancy overheads.

At 410, the base station 105-*c* may transmit, to the UE 115-*e*, a first set of network coding encoded packets including a first redundancy overhead. Additionally, the UE 115-*e* may attempt to receive the first set of network coding encoded packets based on the base station 105-*c* transmitting the set of network coding encoded packets.

At 415, the UE 115-*e* may optionally determine a failure rate associated with the set of network coding encoded packets received from the base station 105-*c* at 410. For example, the UE 115-*e* may estimate the failure rate based on the quantity of the first set of network coding encoded packets that are successfully received when attempting to receive each of the first set of network coding encoded packets. In another example, the UE 115-*e* may estimate the failure rate based on identifying a quantity of the first set of network coding encoded packets that are received via an RLC entity at the UE 115-*e*. That is, the UE 115-*e* may identify one or more empty RLC packet numbers (e.g., indicating that one or more of the first set of network coding encoded packets are not received via the RLC entity). Here, the UE 115-*e* may estimate the failure rate based on the quantity of the first set of network coding encoded packets that are received via the RLC entity.

At 420, the UE 115-*e* may transmit a message to the base station 105-*c*. For example, the message may be a feedback message (e.g., a HARQ NACK message) to the base station 105-*c*. In some cases, the feedback message may indicate a quantity of the first set of network coding encoded packets that the UE 115-*e* did not successfully receive. In another example, the message may be a retransmission request (e.g., an RLC status report message). Additionally, the first message may include an indication of the failure rate (e.g., determined by the UE 115-*e* at 415). In some cases, the UE 115-*e* may transmit the message via a MAC-CE or UCI.

At 425, the base station 105-*c* may determine the failure rate associated with the first set of network coding encoded packets. For example, the base station 105-*c* may determine the failure rate based on receiving the message from the UE 115-*e* at 420.

At 430, the base station 105-*c* identify a redundancy associated with one or more second sets of network coding encoded packets (e.g., based on the determined failure rate). For example, the base station 105-*c* may identify the redundancy overhead based on the configuration (e.g., indicated by the RRC message) for updating the redundancy overhead for sets of network coding encoded packets. That is, the base station 105-*c* may identify the redundancy overhead based on determining that the failure rate determined at 425 exceeds a threshold failure rate. In another case, the base station 105-*c* may identify the redundancy overhead according to the configured periodicity.

At 435, the base station 105-*c* may transmit, to the UE 115-*e*, one or more second sets of network coding encoded packets having the identified redundancy overhead. That is, the base station 105-*c* may encode the one or more second sets of packets using network coding and according to the identified redundancy overhead. The base station 105-*c* may then transmit the one or more second sets of network coding encoded packets to the UE 115-*e*.

Figure 5:
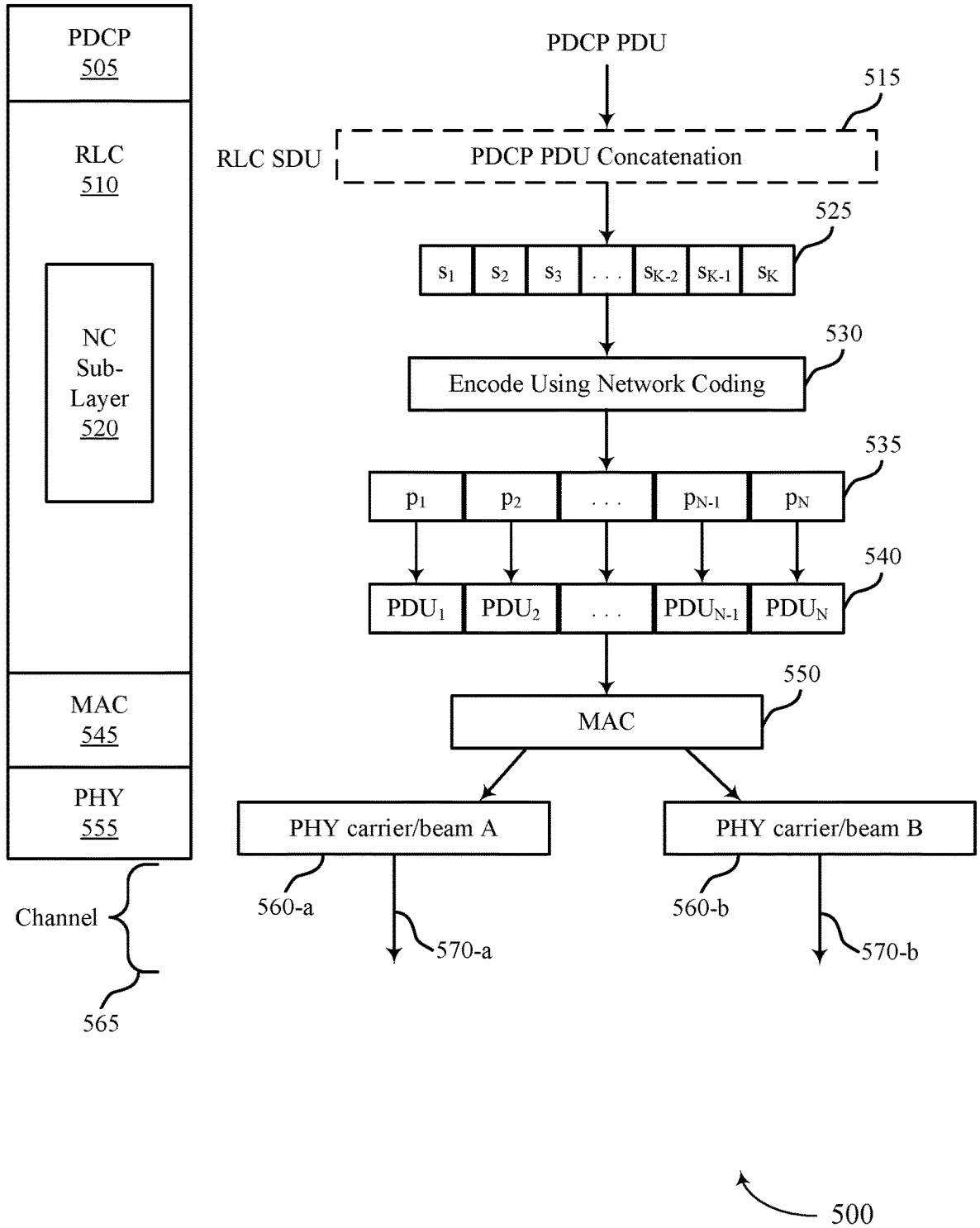
FIG. 5 illustrates an example of protocol stack functions that supports network coding with dynamic redundancy overhead in accordance with aspects of the present disclosure.

FIG. 5 illustrates an example of protocol stack functions 500 that supports network coding with dynamic redundancy overhead in accordance with aspects of the present disclosure. In some examples, protocol stack functions 500 may implement aspects of wireless communications systems 100 or 200. In this example, a protocol stack at a wireless device (e.g., a UE or base station as described herein) may include a PDCP layer 505 that provides PDCP PDUs to the RLC layer 510. The RLC layer 510 may include a network coding sub-layer 520, and provide network coded RLC PDUs to MAC layer 545. The MAC layer 545 may interact with the physical (PHY) layer 555 to provide communications over channel(s) 565. Such protocol stack functions 500 may be performed at any device that transmits network coding encoded packets as discussed herein, such as a UE, base station, and the like. A receiving device may include corresponding layers that perform corresponding receive and decoding functions.

PDCP layer 505 which may provide header compression of IP packets, integrity protection, and ciphering, and may provide PDCP PDUs to the RLC layer 510. The RLC layer 510 may perform packet segmentation and reassembly to communicate over logical channels. The MAC layer 545 may perform priority handling and multiplexing of logical channels into transport channels. The MAC layer 545 may also use error detection techniques, error correction techniques, or both to support retransmissions at the MAC layer 545 to improve link efficiency. At the PHY layer 555, transport channels may be mapped to physical channels.

In the example of FIG. 5, a transmitting device may generate an RLC SDU from one or more PDCP PDUs. In some aspects, a single PDCP PDU may be included in an RLC SDU. In some aspects, optionally, multiple PDCP PDUs may be included in an RLC SDU, such as by concatenating multiple PDCP PDUs at PDCP PDU concatenation function 515. In some aspects, the transmitting device may determine whether to include a single PDCP PDU in a single RLC SDU or whether to concatenate multiple PDCP PDUs in a single RLC SDU based at least in part on a size of the PDCP PDU. For example, if the size of the PDCP PDU satisfies a threshold (e.g., is greater than or equal to the threshold), then the transmitting device may include only the PDCP PDU (e.g., a single PDCP PDU) in a single RLC SDU. If the size of the PDCP PDU does not satisfy a threshold (e.g., is less than or equal to the threshold), then the encoder may concatenate multiple PDCP PDUs (e.g., a set of PDCP PDUs with a total size that is less than or equal to the threshold) into a single RLC SDU.

At 525, the RLC layer 510 may divide the RLC SDU into a number of data blocks. For example, the RLC layer 510 may divide the RLC SDU into k data blocks, shown as $s_1$, through $s_K$. In some aspects, the number of data blocks (e.g., the value of k) is indicated in a configuration message (e.g., an RRC message), which may provide configuration information to network coding. Additionally or alternatively, the transmitting device may determine the number of data blocks based at least in part on an RLC header size (e.g., an RLC header size for network coding encoding packets), a packet payload size, an overhead budget, a channel condition, a target error probability, or any combinations thereof. The data blocks may be provided to network coding sub-layer 520.

At 530, the network coding sub-layer 520 may encode the data blocks into a number of RLC packets (e.g., a set of network coding encoded packets) using network coding. For example, the network coding sub-layer 520 may encode k data blocks into N RLC packets, shown as $p_1$, through $p_N$, using network coding techniques (e.g., Raptor codes). In some aspects, the number of network coding encoded packets (e.g., the value of N) is indicated in a configuration message (e.g., an RRC message) that configures network coding. Additionally or alternatively, the transmitting device may determine the number of network coding encoded packets based at least in part on a target error probability, a channel condition, payload size, or any combinations thereof.

The network coding sub-layer 520 may encode the data blocks into the set of network coding encoding packets having a certain redundancy overhead. That is, one or more of the set of network coding encoding packets may be redundant. The redundancy overhead R associated with the set of network coding encoding packets may be defined below, according to Equation 4. Here, N may correspond to the quantity of the network coding encoding packets within the set of network coding encoding packets and k may correspond to the quantity of data blocks.

$$R = \frac{N-k}{k} \quad (4)$$

In some cases, the network coding sub-layer 520 may dynamically identify a redundancy overhead for encoding the data blocks into the set of network coding encoded packets based on a failure rate associated with a previously transmitted set of network coding encoded packets. Thus, the set of network coding encoded packets may include a quantity of redundant packets that is based on the determined failure rate. The network coding sub-layer 520 may encode the data blocks into the number of RLC packets (e.g., the set of network coding encoded packets) according to the identified redundancy overhead.

At 540, the RLC layer 510 may map the network coding encoded packets from the network coding sub-layer 520 to a corresponding number of RLC PDUs. For example, the RLC layer 510 may map N network coding encoded packets to N RLC PDUs, shown as PDUi, through PDUN. In some aspects, the number of RLC PDUs (e.g., the value of N) may be indicated in a configuration message (e.g., an RRC message) that configured network coding. Additionally or alternatively, the transmitting device may determine the number of RLC PDUs based at least in part on a target error probability, a channel condition, payload size, or any combinations thereof.

At 550, the RLC layer 510 may include the RLC PDUs in a MAC PDU that is provided to MAC layer 545. The MAC layer 545 may perform priority handling and multiplexing the MAC PDU and logical channels into transport channels, and provide the transport channels to the PHY layer 555. The transmitting device may transmit the RLC PDUs (e.g., in the MAC PDU) to a decoder or a receiving device, such as a UE or a base station. In some aspects, the transmitting may transmit using transmit diversity, such as by transmitting on multiple carriers (e.g., using frequency diversity), transmitting using multiple beams (e.g., using spatial diversity), and the like. For example, the transmitting device may transmit a first transmission 570-a containing M RLC PDUs via a first carrier 560-a (where M<N) and/or a first beam, and may transmit a second transmission 570-b containing (N−M) RLC PDUs via a second carrier 560-b and/or a second beam. The receiving device may receive the transmissions 570, and use network coding techniques to decode the RLC PDUs.

Figure 6:
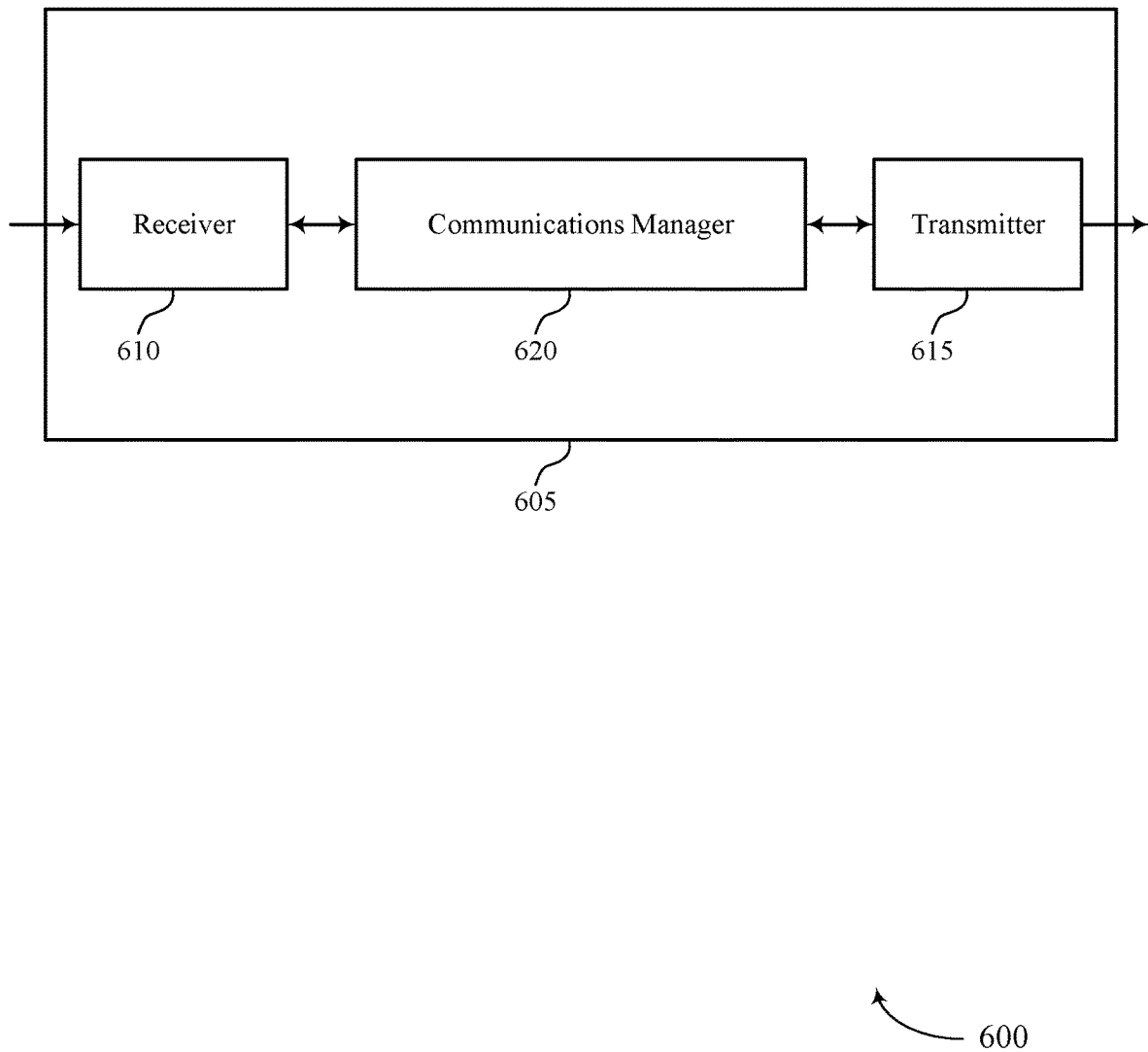
FIGS. 6 and 7 show block diagrams of devices that support network coding with dynamic redundancy overhead in accordance with aspects of the present disclosure.

FIG. 6 shows a block diagram 600 of a device 605 that supports network coding with dynamic redundancy overhead in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to network coding with dynamic redundancy overhead). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network coding with dynamic redundancy overhead). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of network coding with dynamic redundancy overhead as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. For example, the communications manager 620 may be configured as or otherwise support a means for determining a failure rate associated with a transmission of a first set of network coding encoded packets to a UE. The communications manager 620 may be configured as or otherwise support a means for identifying a redundancy overhead associated with one or more second sets of network coding encoded packets for the UE based on the failure rate associated with the transmission of the first set of network coding encoded packets to the UE. The communications manager 620 may be configured as or otherwise support a means for transmitting the one or more second sets of network coding encoded packets to the UE, the one or more second sets of network coding encoded packets being transmitted using the identified redundancy overhead.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources while still maintaining reliable communications. That is, the communications manager 620 may be configured to dynamically allocate resources for redundancy overhead based on a channel quality, which may decrease a likelihood of excessive redundancy overhead (e.g., resulting in less efficient utilization of communication resources) and insufficient redundancy overhead (e.g., resulting in less reliable communications).

Figure 7:
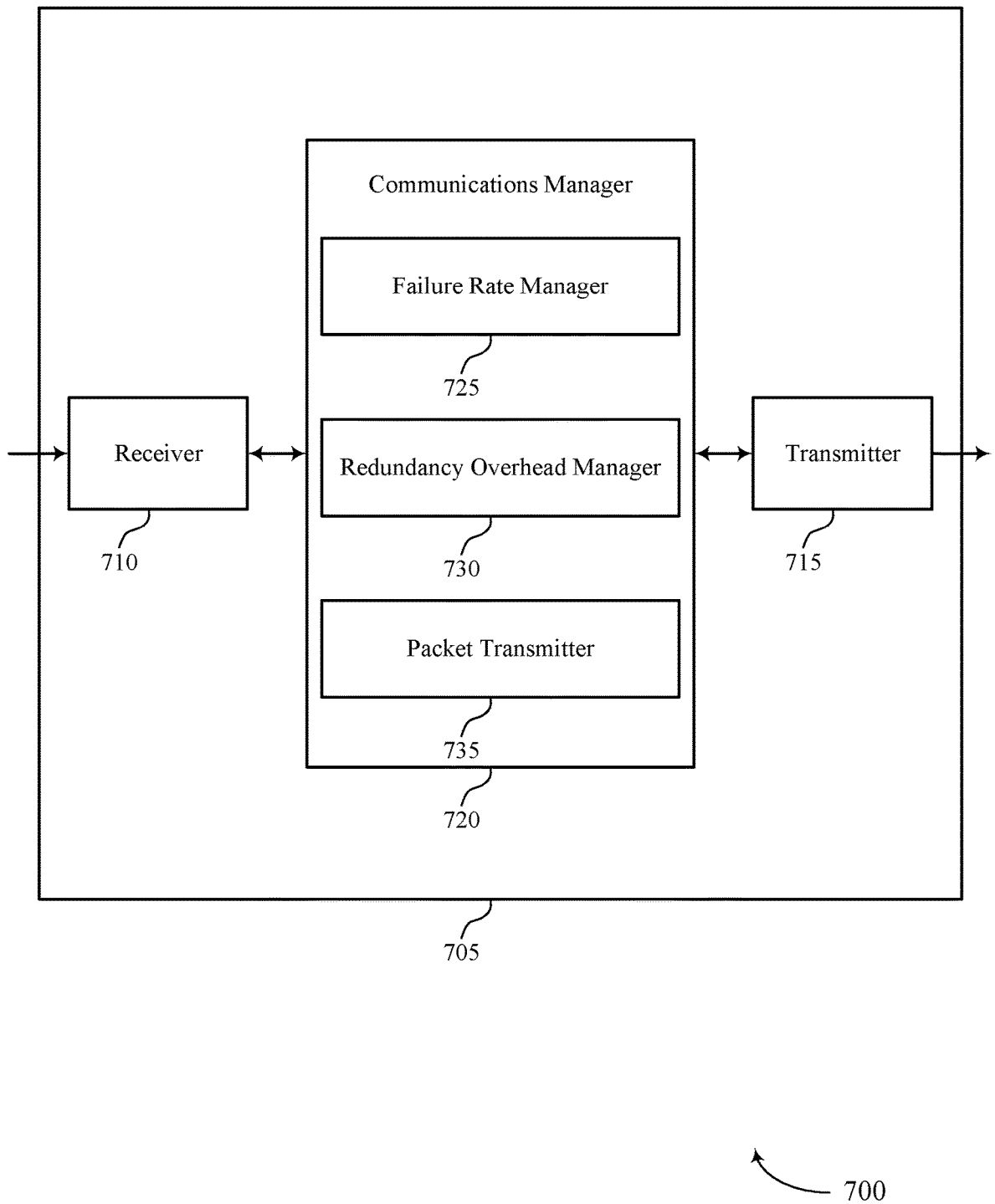

FIG. 7 shows a block diagram 700 of a device 705 that supports network coding with dynamic redundancy overhead in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to network coding with dynamic redundancy overhead). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to network coding with dynamic redundancy overhead). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of network coding with dynamic redundancy overhead as described herein. For example, the communications manager 720 may include a failure rate manager 725, a redundancy overhead manager 730, a packet transmitter 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a base station in accordance with examples as disclosed herein. The failure rate manager 725 may be configured as or otherwise support a means for determining a failure rate associated with a transmission of a first set of network coding encoded packets to a UE. The redundancy overhead manager 730 may be configured as or otherwise support a means for identifying a redundancy overhead associated with one or more second sets of network coding encoded packets for the UE based on the failure rate associated with the transmission of the first set of network coding encoded packets to the UE. The packet transmitter 735 may be configured as or otherwise support a means for transmitting the one or more second sets of network coding encoded packets to the UE, the one or more second sets of network coding encoded packets being transmitted using the identified redundancy overhead.

Figure 8:
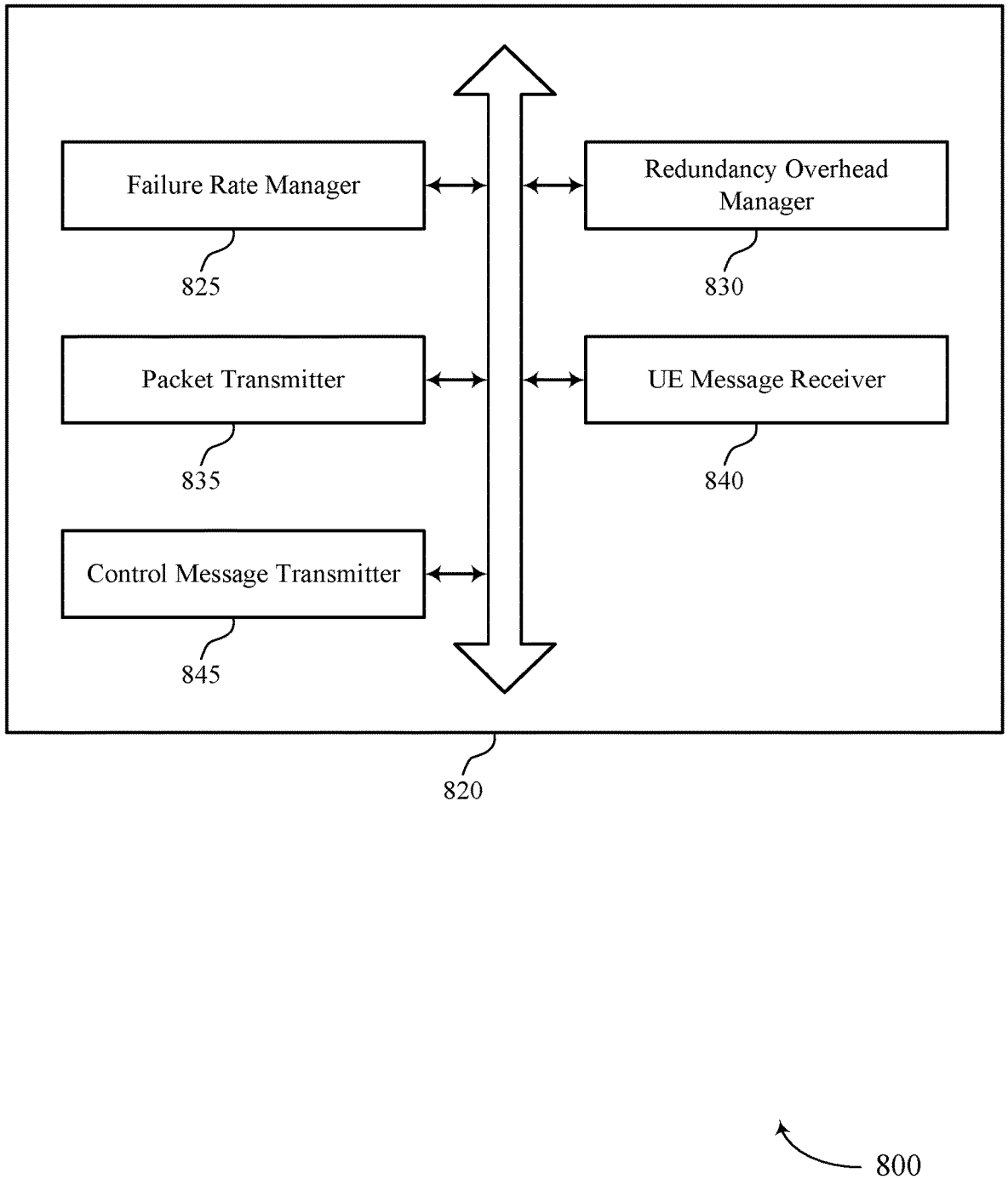
FIG. 8 shows a block diagram of a communications manager that supports network coding with dynamic redundancy overhead in accordance with aspects of the present disclosure.

FIG. 8 shows a block diagram 800 of a communications manager 820 that supports network coding with dynamic redundancy overhead in accordance with aspects of the present disclosure. The communications manager 820 may be an example of aspects of a communications manager 620, a communications manager 720, or both, as described herein. The communications manager 820, or various components thereof, may be an example of means for performing various aspects of network coding with dynamic redundancy overhead as described herein. For example, the communications manager 820 may include a failure rate manager 825, a redundancy overhead manager 830, a packet transmitter 835, a UE message receiver 840, a control message transmitter 845, or any combination thereof. Each of these components may communicate, directly or indirectly, with one another (e.g., via one or more buses).

The communications manager 820 may support wireless communication at a base station in accordance with examples as disclosed herein. The failure rate manager 825 may be configured as or otherwise support a means for determining a failure rate associated with a transmission of a first set of network coding encoded packets to a UE. The redundancy overhead manager 830 may be configured as or otherwise support a means for identifying a redundancy overhead associated with one or more second sets of network coding encoded packets for the UE based on the failure rate associated with the transmission of the first set of network coding encoded packets to the UE. The packet transmitter 835 may be configured as or otherwise support a means for transmitting the one or more second sets of network coding encoded packets to the UE, the one or more second sets of network coding encoded packets being transmitted using the identified redundancy overhead.

In some examples, to support identifying the redundancy overhead, the redundancy overhead manager 830 may be configured as or otherwise support a means for identifying that the failure rate associated with the transmission of the first set of network coding encoded packets to the UE exceeds a threshold failure rate. In some examples, to support identifying the redundancy overhead, the redundancy overhead manager 830 may be configured as or otherwise support a means for determining the redundancy overhead based on the failure rate exceeding the threshold failure rate. In some cases, to support identifying the redundancy overhead, the redundancy overhead manager 830 may be configured as or otherwise support a means for identifying the redundancy overhead periodically and in accordance with a periodicity for identifying redundancy overheads. In some instances, to support identifying the redundancy overhead, the redundancy overhead manager 830 may be configured as or otherwise support a means for identifying the redundancy overhead in response to a first message, received from the UE, requesting an updated redundancy overhead for the one or more second sets of network coding encoded packets.

In some examples, the control message transmitter 845 may be configured as or otherwise support a means for transmitting, to the UE, a radio resource control message indicating one or more of a periodicity for updating redundancy overheads and a threshold failure rate associated with updating redundancy overheads, where the first message is in accordance with the radio resource control message.

In some examples, the UE message receiver 840 may be configured as or otherwise support a means for receiving, in the first message, an indication of the failure rate, where determining the failure rate associated with the transmission of the first set of network coding encoded packets to the UE is based on the indication of the failure rate. In some cases, the UE message receiver 840 may be configured as or otherwise support a means for receiving the first message via a MAC-CE or UCI. In some examples, the UE message receiver 840 may be configured as or otherwise support a means for receiving a first message from the UE in response to the transmission of the first set of network coding encoded packets to the UE, where determining the failure rate is based on the first message. In some examples, the first message is a feedback message or a retransmission request associated with the transmission of the first set of network coding encoded packets. In some instances, the feedback message is a HARQ NACK feedback message. In some examples, determining the failure rate includes estimating the failure rate based on the feedback message or the retransmission request. In some cases, the retransmission request is an RLC status report message. In some examples, the first message includes an indication of the failure rate. Here, the determined failure rate is the indicated failure rate.

In some examples, the packet transmitter 835 may be configured as or otherwise support a means for transmitting the first set of network coding encoded packets to the UE including an initial redundancy overhead different from the identified redundancy overhead, where determining the failure rate is based on transmitting the first set of network coding encoded packets to the UE. In some cases, the packet transmitter 835 may be configured as or otherwise support a means for transmitting a third set of network coding encoded packets to a second UE different from the UE, where the third set of network coding encoded packets includes a second redundancy overhead different from the identified redundancy overhead.

Figure 9:
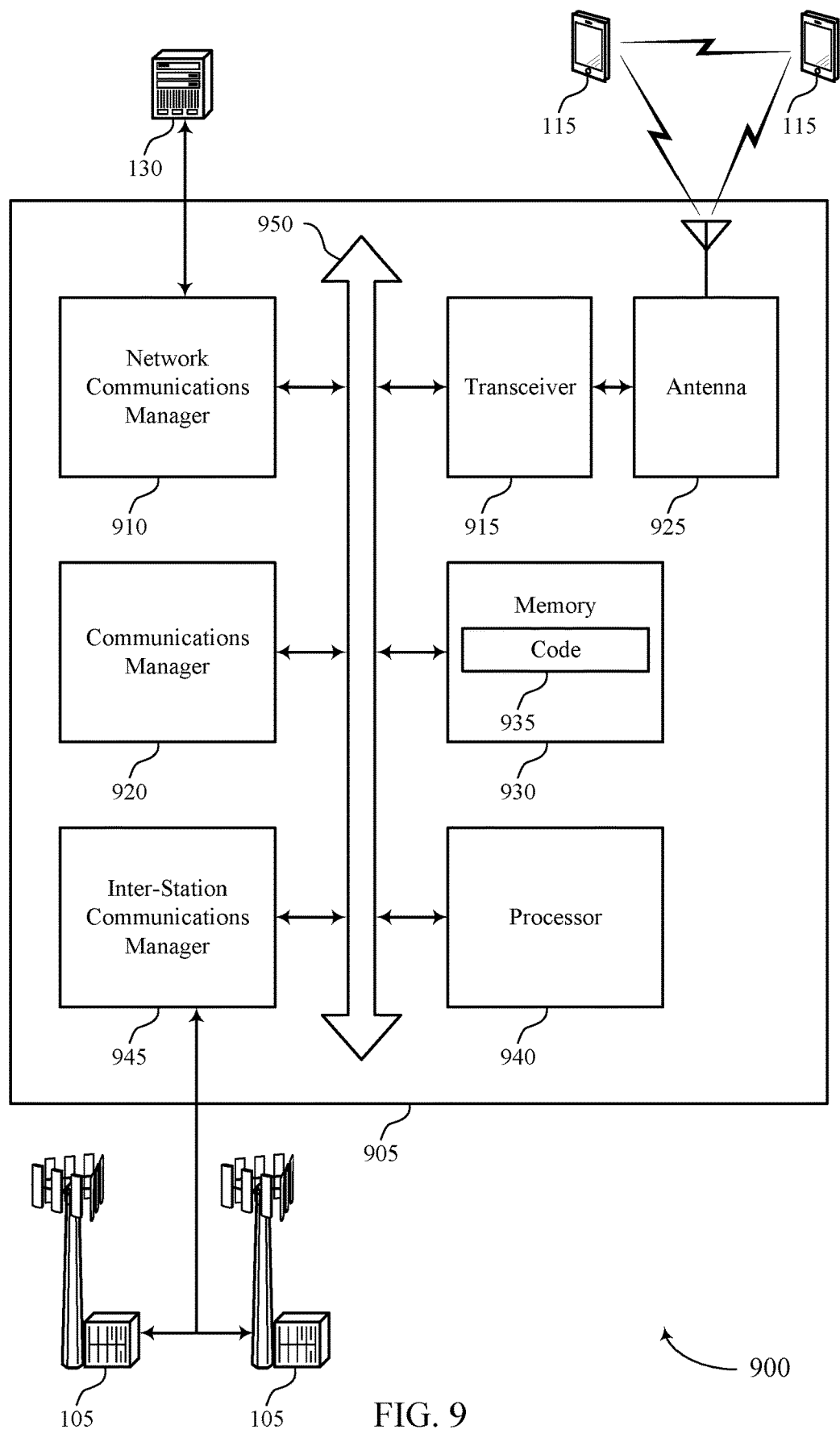
FIG. 9 shows a diagram of a system including a device that supports network coding with dynamic redundancy overhead in accordance with aspects of the present disclosure.

FIG. 9 shows a diagram of a system 900 including a device 905 that supports network coding with dynamic redundancy overhead in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting network coding with dynamic redundancy overhead). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a base station in accordance with examples as disclosed herein. For example, the communications manager 920 may be configured as or otherwise support a means for determining a failure rate associated with a transmission of a first set of network coding encoded packets to a UE. The communications manager 920 may be configured as or otherwise support a means for identifying a redundancy overhead associated with one or more second sets of network coding encoded packets for the UE based on the failure rate associated with the transmission of the first set of network coding encoded packets to the UE. The communications manager 920 may be configured as or otherwise support a means for transmitting the one or more second sets of network coding encoded packets to the UE, the one or more second sets of network coding encoded packets being transmitted using the identified redundancy overhead.

By including or configuring the communications manager 920 in accordance with examples as described herein, the device 905 may support techniques for improved communication reliability and more efficient utilization of communication resources. That is, the communications manager 920 may be configured to dynamically identify redundancy overhead based on a channel quality, which may decrease a likelihood of excessive redundancy overhead (e.g., resulting in less efficient utilization of communication resources) and insufficient redundancy overhead (e.g., resulting in less reliable communications).

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of network coding with dynamic redundancy overhead as described herein, or the processor 940 and the memory 930 may be otherwise configured to perform or support such operations.

Figure 10:
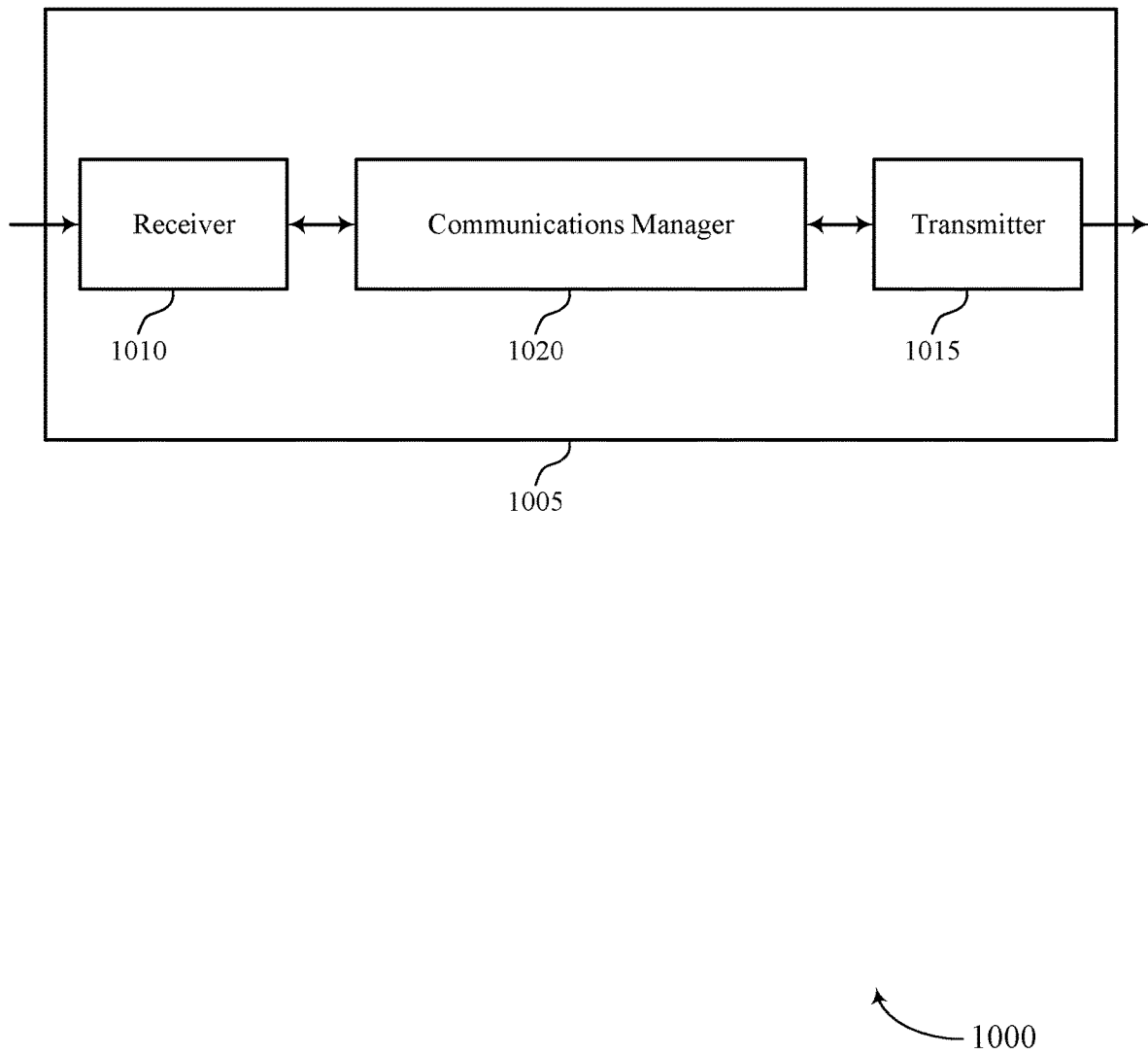
FIGS. 10 and 11 show block diagrams of devices that support network coding with dynamic redundancy overhead in accordance with aspects of the present disclosure.

FIG. 10 shows a block diagram 1000 of a device 1005 that supports network coding with dynamic redundancy overhead in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to network coding with dynamic redundancy overhead). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network coding with dynamic redundancy overhead). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of network coding with dynamic redundancy overhead as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), an FPGA, or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a base station, a first set of network coding encoded packets including a first redundancy overhead. The communications manager 1020 may be configured as or otherwise support a means for determining a failure rate associated with the first set of network coding encoded packets. The communications manager 1020 may be configured as or otherwise support a means for transmitting, to the base station, a message related to a second redundancy overhead based on the determined failure rate, where the second redundancy overhead is different from the first redundancy overhead. The communications manager 1020 may be configured as or otherwise support a means for receiving, from the base station and based on transmitting the message, one or more second sets of network coding encoded packets transmitted with the second redundancy overhead.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources while maintaining reliable communications. That is, the communications manager 1020 may be configured to request for updated redundancy overhead based on a channel quality, which may decrease a likelihood of excessive redundancy overhead (e.g., resulting in less efficient utilization of communication resources) and insufficient redundancy overhead (e.g., resulting in less reliable communications).

Figure 11:
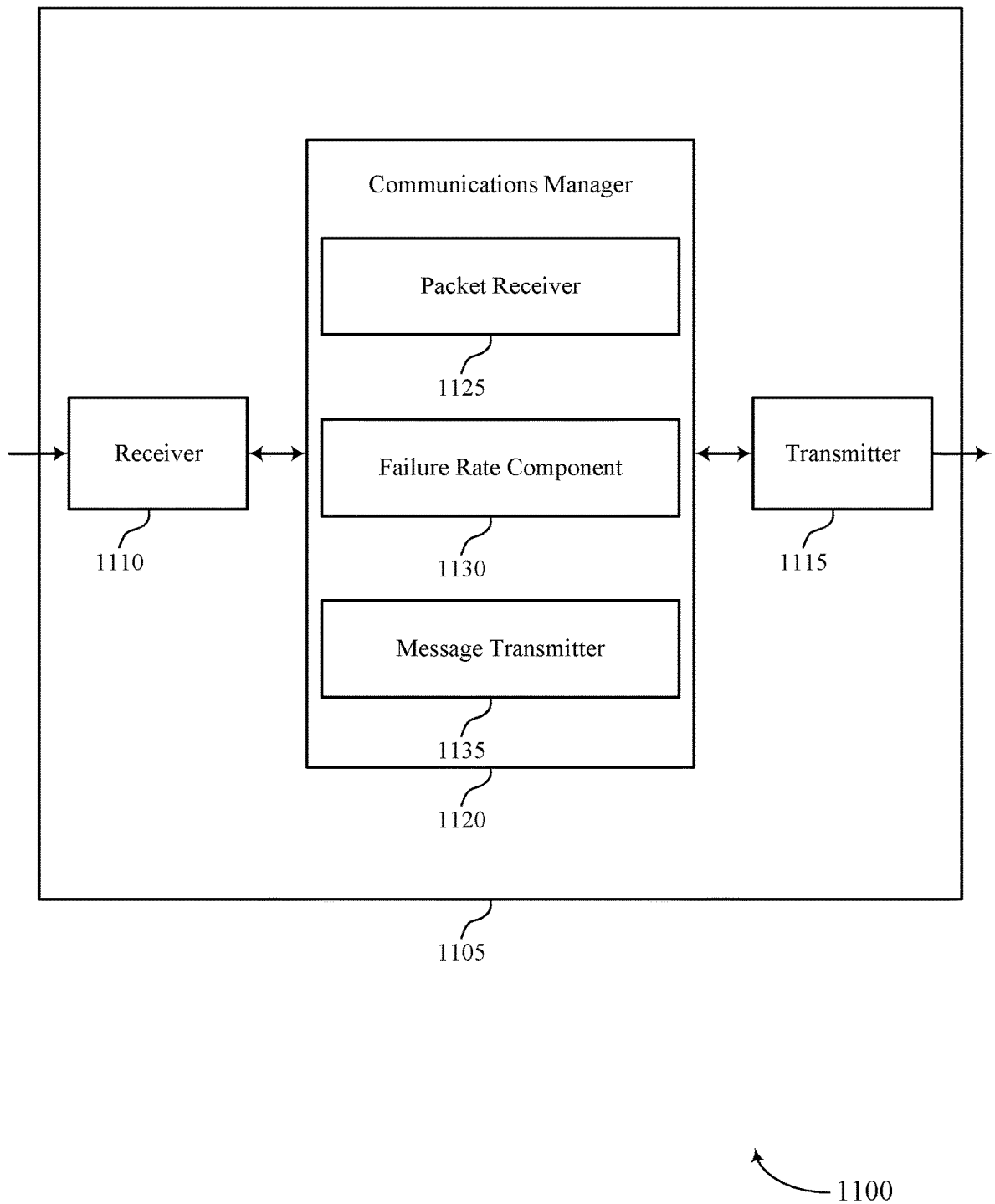

FIG. 11 shows a block diagram 1100 of a device 1105 that supports network coding with dynamic redundancy overhead in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to network coding with dynamic redundancy overhead). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to network coding with dynamic redundancy overhead). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of network coding with dynamic redundancy overhead as described herein. For example, the communications manager 1120 may include a packet receiver 1125, a failure rate component 1130, a message transmitter 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The packet receiver 1125 may be configured as or otherwise support a means for receiving, from a base station, a first set of network coding encoded packets including a first redundancy overhead. The failure rate component 1130 may be configured as or otherwise support a means for determining a failure rate associated with the first set of network coding encoded packets. The message transmitter 1135 may be configured as or otherwise support a means for transmitting, to the base station, a message related to a second redundancy overhead based on the determined failure rate, where the second redundancy overhead is different from the first redundancy overhead. The packet receiver 1125 may be configured as or otherwise support a means for receiving, from the base station and based on transmitting the message, one or more second sets of network coding encoded packets transmitted with the second redundancy overhead.

Figure 12:
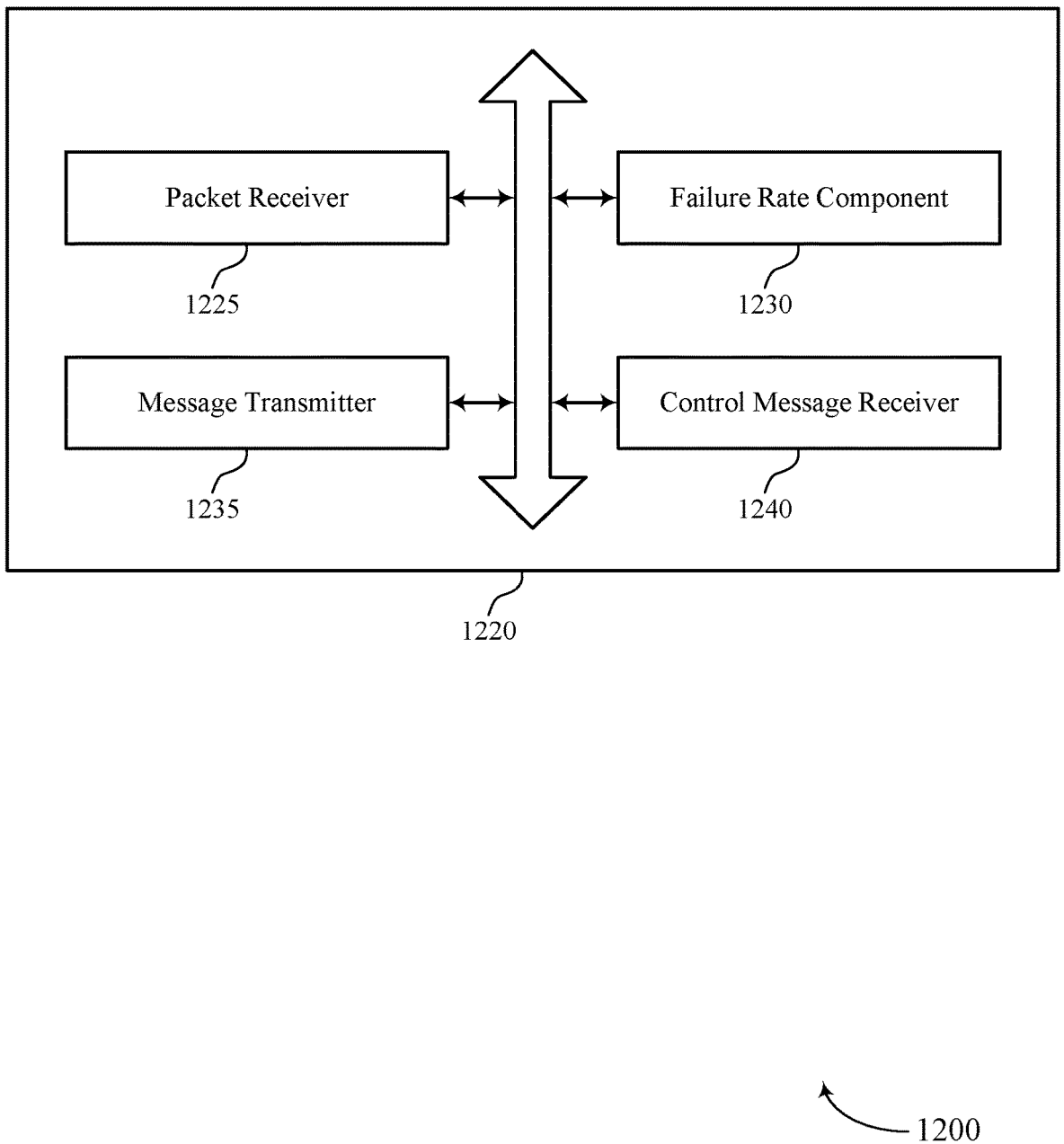
FIG. 12 shows a block diagram of a communications manager that supports network coding with dynamic redundancy overhead in accordance with aspects of the present disclosure.

FIG. 12 shows a block diagram 1200 of a communications manager 1220 that supports network coding with dynamic redundancy overhead in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of network coding with dynamic redundancy overhead as described herein. For example, the communications manager 1220 may include a packet receiver 1225, a failure rate component 1230, a message transmitter 1235, a control message receiver 1240, or any combination thereof. Each of these components may communicate, directly or indirectly, with one another (e.g., via one or more buses).

The communications manager 1220 may support wireless communication at a UE in accordance with examples as disclosed herein. The packet receiver 1225 may be configured as or otherwise support a means for receiving, from a base station, a first set of network coding encoded packets including a first redundancy overhead. The failure rate component 1230 may be configured as or otherwise support a means for determining a failure rate associated with the first set of network coding encoded packets. The message transmitter 1235 may be configured as or otherwise support a means for transmitting, to the base station, a message related to a second redundancy overhead based on the determined failure rate, where the second redundancy overhead is different from the first redundancy overhead. In some examples, the packet receiver 1225 may be configured as or otherwise support a means for receiving, from the base station and based on transmitting the message, one or more second sets of network coding encoded packets transmitted with the second redundancy overhead.

In some examples, to support transmitting the message related to the second redundancy overhead, the message transmitter 1235 may be configured as or otherwise support a means for transmitting a request to update the first redundancy overhead to the second redundancy overhead for the one or more second sets of network coding encoded packets.

In some examples, the failure rate component 1230 may be configured as or otherwise support a means for identifying that the failure rate associated with the first set of network coding encoded packets exceeds a threshold failure rate, where transmitting the request to update the first redundancy overhead is based on the failure rate exceeding the threshold failure rate.

In some examples, to support transmitting the request to update the first redundancy overhead, the message transmitter 1235 may be configured as or otherwise support a means for transmitting the request to update the first redundancy overhead periodically and in accordance with a periodicity for updating redundancy overheads.

In some examples, the control message receiver 1240 may be configured as or otherwise support a means for receiving, from the base station, a radio resource control message indicating one or more of a periodicity for updating redundancy overheads and a threshold failure rate associated with updating redundancy overheads, where the request to update the first redundancy overhead is in accordance with the radio resource control message.

In some examples, to support transmitting the message related to the second redundancy overhead, the message transmitter 1235 may be configured as or otherwise support a means for transmitting the message via a medium access control-control element or uplink control information.

In some examples, the message related to the second redundancy overhead includes an indication of the failure rate associated with the first set of network coding encoded packets.

In some examples, to support determining the failure rate, the failure rate component 1230 may be configured as or otherwise support a means for attempting to receive each of the first set of network coding encoded packets. In some examples, to support determining the failure rate, the failure rate component 1230 may be configured as or otherwise support a means for estimating the failure rate based on a quantity of the first set of network coding encoded packets that are successfully received when attempting to receive each of the first set of network coding encoded packets.

In some examples, to support determining the failure rate, the failure rate component 1230 may be configured as or otherwise support a means for identifying a quantity of the first set of network coding encoded packets that are received via an RLC entity at the UE. In some examples, to support determining the failure rate, the failure rate component 1230 may be configured as or otherwise support a means for estimating the failure rate based on the quantity of the first set of network coding encoded packets that are received via the RLC entity.

Figure 13:
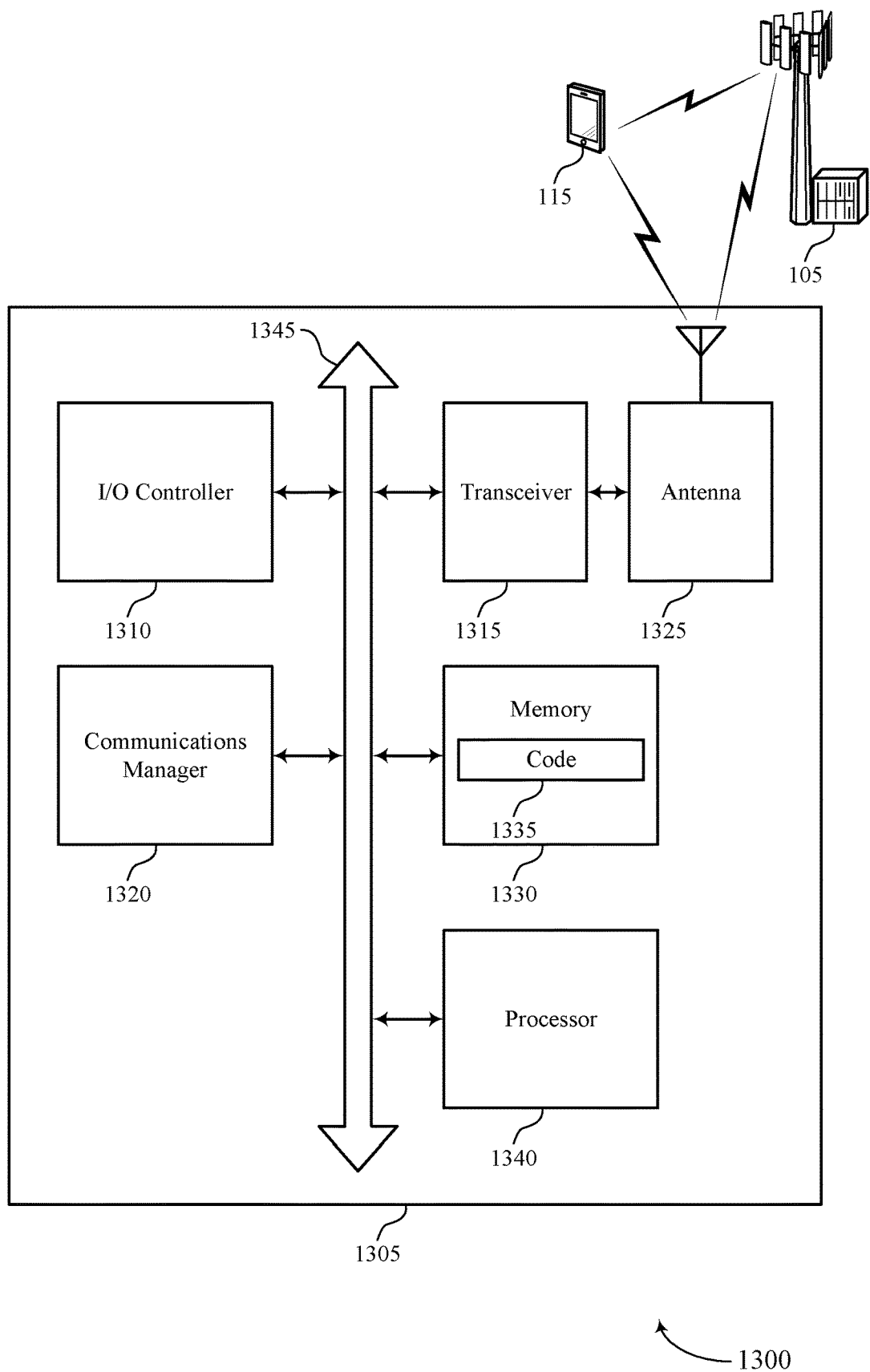
FIG. 13 shows a diagram of a system including a device that supports network coding with dynamic redundancy overhead in accordance with aspects of the present disclosure.

FIG. 13 shows a diagram of a system 1300 including a device 1305 that supports network coding with dynamic redundancy overhead in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting network coding with dynamic redundancy overhead). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a base station, a first set of network coding encoded packets including a first redundancy overhead. The communications manager 1320 may be configured as or otherwise support a means for determining a failure rate associated with the first set of network coding encoded packets. The communications manager 1320 may be configured as or otherwise support a means for transmitting, to the base station, a message related to a second redundancy overhead based on the determined failure rate, where the second redundancy overhead is different from the first redundancy overhead. The communications manager 1320 may be configured as or otherwise support a means for receiving, from the base station and based on transmitting the message, one or more second sets of network coding encoded packets transmitted with the second redundancy overhead.

By including or configuring the communications manager 1320 in accordance with examples as described herein, the device 1305 may support techniques for improved communication reliability and more efficient utilization of communication resources. That is, the communications manager 1320 may be configured to request for updated redundancy overhead based on a channel quality, which may decrease a likelihood of excessive redundancy overhead (e.g., resulting in less efficient utilization of communication resources) and insufficient redundancy overhead (e.g., resulting in less reliable communications).

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of network coding with dynamic redundancy overhead as described herein, or the processor 1340 and the memory 1330 may be otherwise configured to perform or support such operations.

Figure 14:
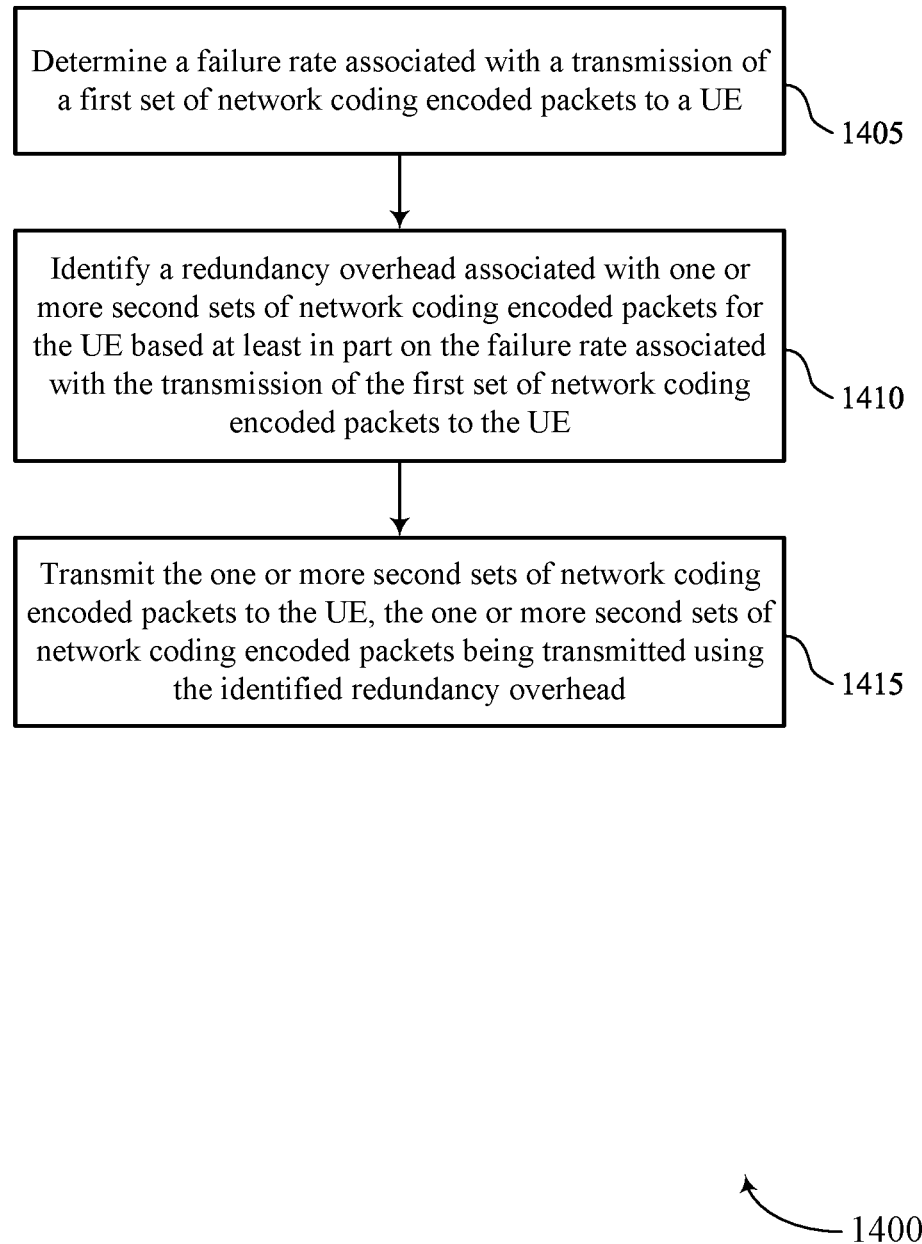
FIGS. 14 through 17 show flowcharts illustrating methods that support network coding with dynamic redundancy overhead in accordance with aspects of the present disclosure.

FIG. 14 shows a flowchart illustrating a method 1400 that supports network coding with dynamic redundancy overhead in accordance with aspects of the present disclosure. The operations of the method 1400 may be implemented by a base station or its components as described herein. For example, the operations of the method 1400 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include determining a failure rate associated with a transmission of a first set of network coding encoded packets to a UE. The operations of 1405 may be performed in accordance with examples as disclosed herein. In some examples, aspects of the operations of 1405 may be performed by a failure rate manager 825 as described with reference to FIG. 8.

At 1410, the method may include identifying a redundancy overhead associated with one or more second sets of network coding encoded packets for the UE based on the failure rate associated with the transmission of the first set of network coding encoded packets to the UE. The operations of 1410 may be performed in accordance with examples as disclosed herein. In some examples, aspects of the operations of 1410 may be performed by a redundancy overhead manager 830 as described with reference to FIG. 8.

At 1415, the method may include transmitting the one or more second sets of network coding encoded packets to the UE, the one or more second sets of network coding encoded packets being transmitted using the identified redundancy overhead. The operations of 1415 may be performed in accordance with examples as disclosed herein. In some examples, aspects of the operations of 1415 may be performed by a packet transmitter 835 as described with reference to FIG. 8.

Figure 15:
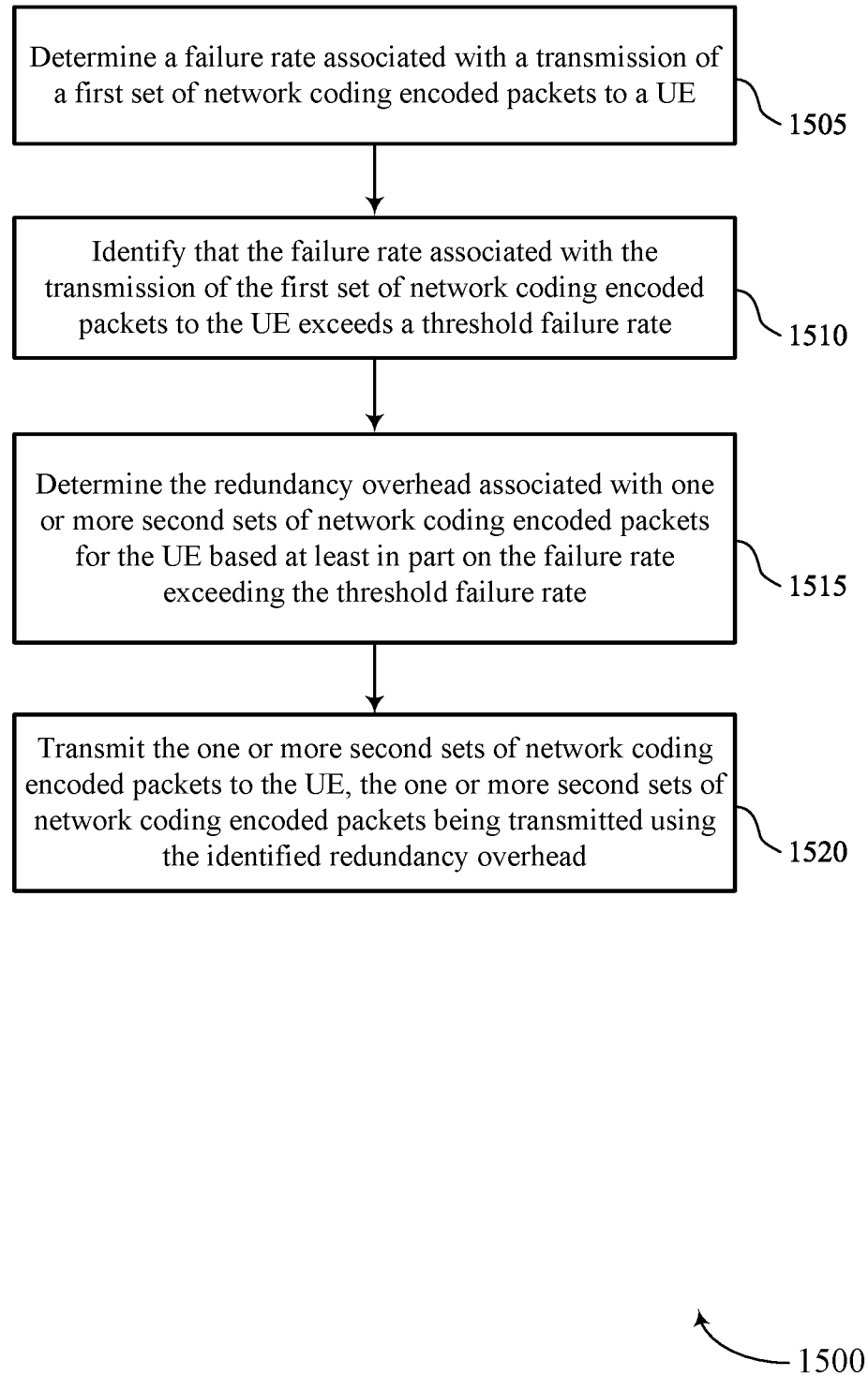

FIG. 15 shows a flowchart illustrating a method 1500 that supports network coding with dynamic redundancy overhead in accordance with aspects of the present disclosure. The operations of the method 1500 may be implemented by a base station or its components as described herein. For example, the operations of the method 1500 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1505, the method may include determining a failure rate associated with a transmission of a first set of network coding encoded packets to a UE. The operations of 1505 may be performed in accordance with examples as disclosed herein. In some examples, aspects of the operations of 1505 may be performed by a failure rate manager 825 as described with reference to FIG. 8.

At 1510, the method may include identifying that the failure rate associated with the transmission of the first set of network coding encoded packets to the UE exceeds a threshold failure rate. The operations of 1510 may be performed in accordance with examples as disclosed herein. In some examples, aspects of the operations of 1510 may be performed by a redundancy overhead manager 830 as described with reference to FIG. 8.

At 1515, the method may include determining a redundancy overhead associated with one or more second sets of network coding encoded packets for the UE based on the failure rate exceeding the threshold failure rate. The operations of 1515 may be performed in accordance with examples as disclosed herein. In some examples, aspects of the operations of 1515 may be performed by a redundancy overhead manager 830 as described with reference to FIG. 8.

At 1520, the method may include transmitting the one or more second sets of network coding encoded packets to the UE, the one or more second sets of network coding encoded packets being transmitted using the identified redundancy overhead. The operations of 1520 may be performed in accordance with examples as disclosed herein. In some examples, aspects of the operations of 1520 may be performed by a packet transmitter 835 as described with reference to FIG. 8.

Figure 16:
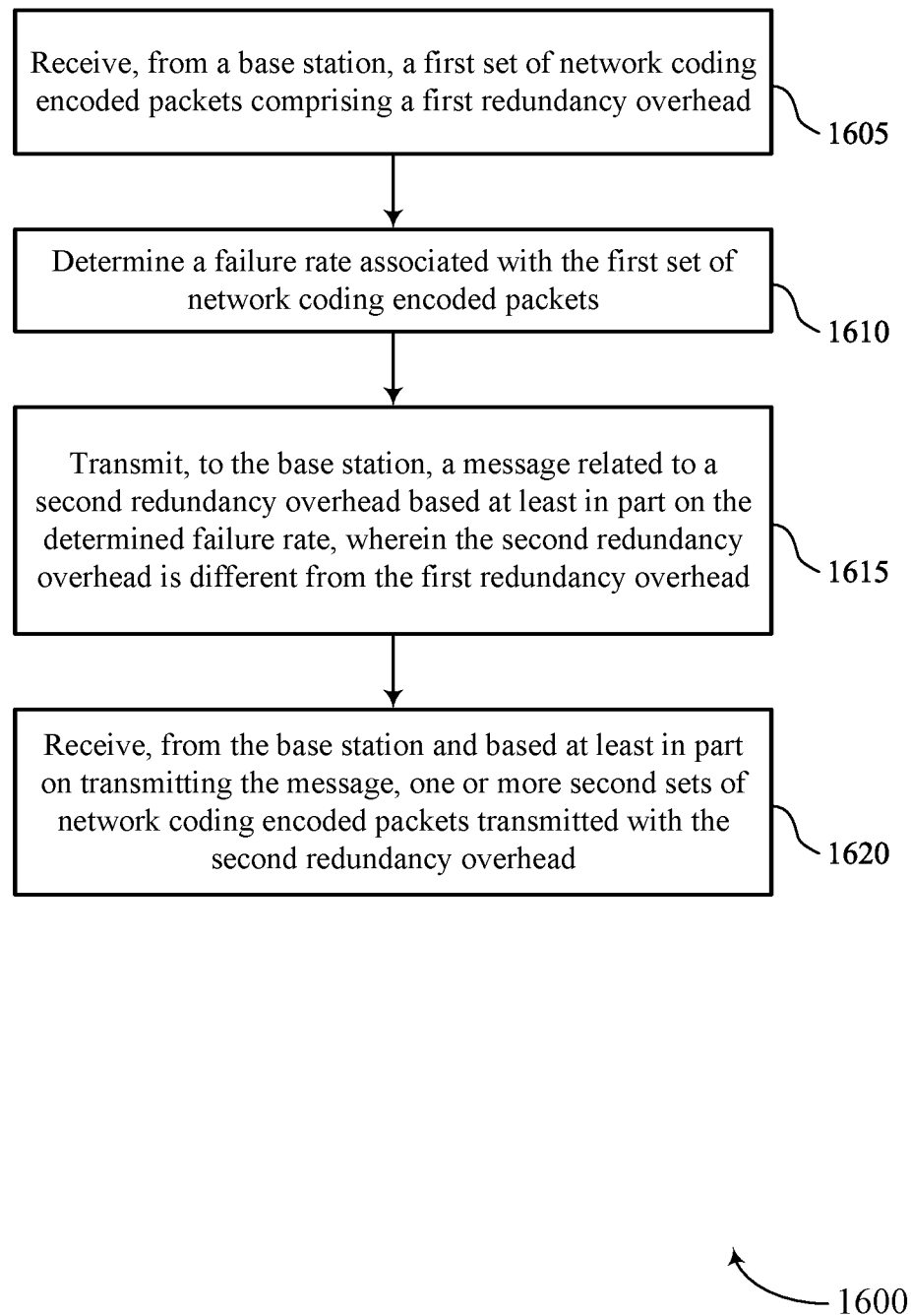

FIG. 16 shows a flowchart illustrating a method 1600 that supports network coding with dynamic redundancy overhead in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first set of network coding encoded packets including a first redundancy overhead. The operations of 1605 may be performed in accordance with examples as disclosed herein. In some examples, aspects of the operations of 1605 may be performed by a packet receiver 1225 as described with reference to FIG. 12.

At 1610, the method may include determining a failure rate associated with the first set of network coding encoded packets. The operations of 1610 may be performed in accordance with examples as disclosed herein. In some examples, aspects of the operations of 1610 may be performed by a failure rate component 1230 as described with reference to FIG. 12.

At 1615, the method may include transmitting, to the base station, a message related to a second redundancy overhead based on the determined failure rate, where the second redundancy overhead is different from the first redundancy overhead. For example, the message may be a request to update the first redundancy overhead to the second redundancy overhead for the one or more second sets of network coding encoded packets. In another example, the message may include an indication of the failure rate associated with the first set of network coding encoded packets (e.g., transmitted via a MAC-CE or UCI). In some cases, the method may additionally include transmitting, to the base station, a report. For example, the report could be HARQ NACK feedback for the first set of network coding encoded packets. In another example, the report could be an RLC retransmission request for RLC entities. The operations of 1615 may be performed in accordance with examples as disclosed herein. In some examples, aspects of the operations of 1615 may be performed by a message transmitter 1235 as described with reference to FIG. 12.

At 1620, the method may include receiving, from the base station and based on transmitting the message, one or more second sets of network coding encoded packets transmitted with the second redundancy overhead. The operations of 1620 may be performed in accordance with examples as disclosed herein. In some examples, aspects of the operations of 1620 may be performed by a packet receiver 1225 as described with reference to FIG. 12.

Figure 17:
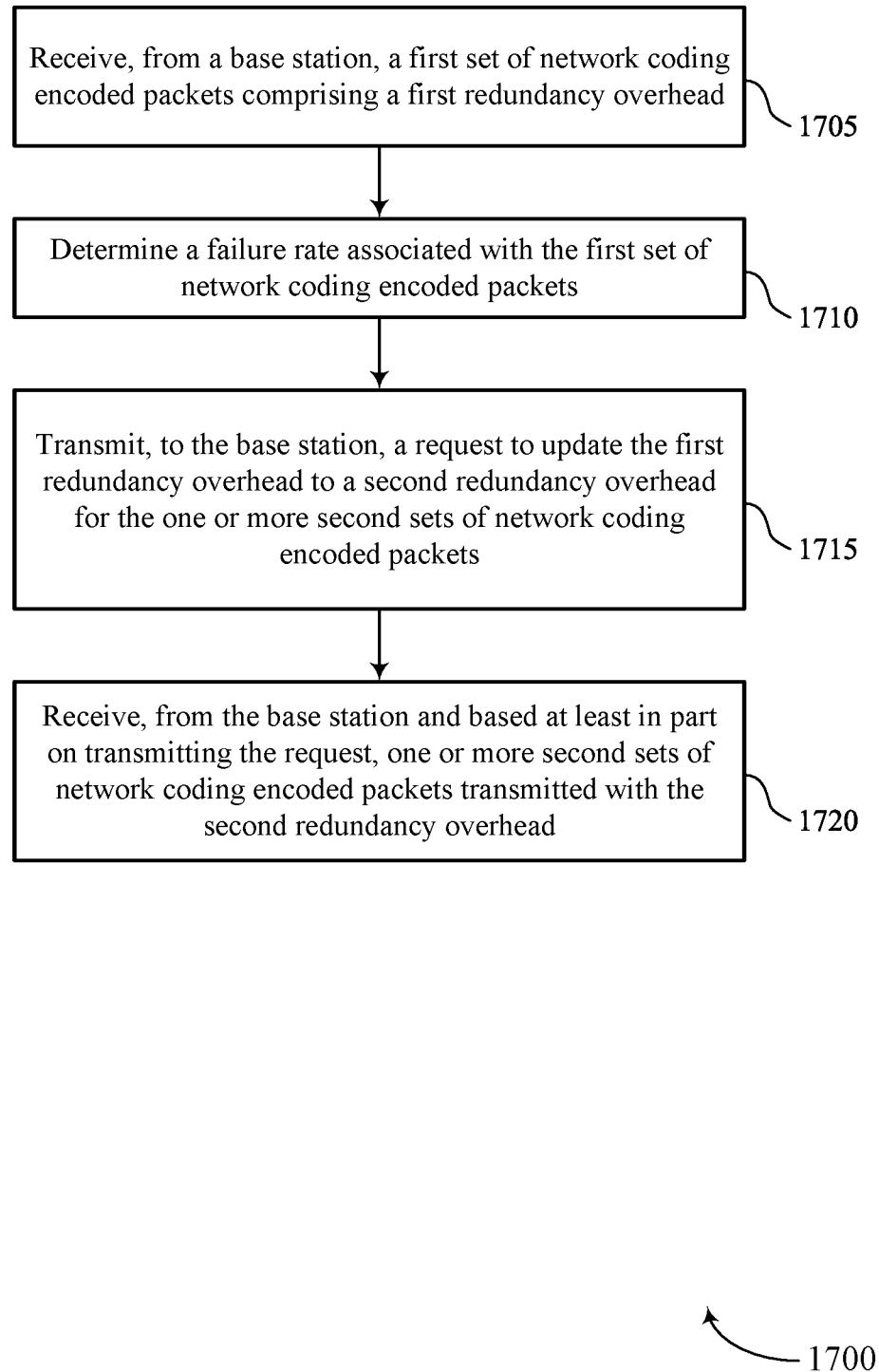

FIG. 17 shows a flowchart illustrating a method 1700 that supports network coding with dynamic redundancy overhead in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a first set of network coding encoded packets including a first redundancy overhead. The operations of 1705 may be performed in accordance with examples as disclosed herein. In some examples, aspects of the operations of 1705 may be performed by a packet receiver 1225 as described with reference to FIG. 12.

At 1710, the method may include determining a failure rate associated with the first set of network coding encoded packets. The operations of 1710 may be performed in accordance with examples as disclosed herein. In some examples, aspects of the operations of 1710 may be performed by a failure rate component 1230 as described with reference to FIG. 12.

At 1715, the method may include transmitting, to the base station, a request to update the first redundancy overhead to a second redundancy overhead (e.g., different than the first redundancy overhead) for the one or more second sets of network coding encoded packets. The operations of 1715 may be performed in accordance with examples as disclosed herein. In some examples, aspects of the operations of 1715 may be performed by a message transmitter 1235 as described with reference to FIG. 12.

At 1720, the method may include receiving, from the base station and based on transmitting the message, one or more second sets of network coding encoded packets transmitted with the second redundancy overhead. The operations of 1720 may be performed in accordance with examples as disclosed herein. In some examples, aspects of the operations of 1720 may be performed by a packet receiver 1225 as described with reference to FIG. 12.

The following provides an overview of aspects of the present disclosure:

Aspect 1: A method for wireless communication at a base station, comprising: determining a failure rate associated with a transmission of a first set of network coding encoded packets to a UE; identifying a redundancy overhead associated with one or more second sets of network coding encoded packets for the UE based at least in part on the failure rate associated with the transmission of the first set of network coding encoded packets to the UE; and transmitting the one or more second sets of network coding encoded packets to the UE, the one or more second sets of network coding encoded packets being transmitted using the identified redundancy overhead.

Aspect 2: The method of aspect 1, wherein identifying the redundancy overhead further comprises: identifying that the failure rate associated with the transmission of the first set of network coding encoded packets to the UE exceeds a threshold failure rate; and determining the redundancy overhead based at least in part on the failure rate exceeding the threshold failure rate.

Aspect 3: The method of any of aspects 1 and 2, wherein identifying the redundancy overhead further comprises: identifying the redundancy overhead periodically and in accordance with a periodicity for identifying redundancy overheads.

Aspect 4: The method of any of aspects 1 through 3, wherein identifying the redundancy overhead further comprises: identifying the redundancy overhead in response to a first message, received from the UE, requesting an updated redundancy overhead for the one or more second sets of network coding encoded packets.

Aspect 5: The method of aspect 4, further comprising: transmitting, to the UE, a RRC message indicating one or more of a periodicity for updating redundancy overheads and a threshold failure rate associated with updating redundancy overheads, wherein the first message is in accordance with the RRC message.

Aspect 6: The method of any of aspects 4 and 5, further comprising: receiving, in the first message, an indication of the failure rate, wherein determining the failure rate associated with the transmission of the first set of network coding encoded packets to the UE is based at least in part on the indication of the failure rate.

Aspect 7: The method of any of aspects 4 through 6, further comprising: receiving the first message via a MAC-CE or UCI.

Aspect 8: The method of any of aspects 1 through 7, further comprising: receiving a first message from the UE in response to the transmission of the first set of network coding encoded packets to the UE, wherein determining the failure rate is based at least in part on the first message.

Aspect 9: The method of aspect 8, wherein the first message is a feedback message or a retransmission request associated with the transmission of the first set of network coding encoded packets; and determining the failure rate comprises estimating the failure rate based at least in part on the feedback message or the retransmission request.

Aspect 10: The method of aspect 9, wherein the feedback message is a HARQ NACK feedback message.

Aspect 11: The method of any of aspect 9, wherein the retransmission request is a RLC status report message.

Aspect 12: The method of any of aspects 8 through 11, wherein the first message comprises an indication of the failure rate; and the determined failure rate is the indicated failure rate.

Aspect 13: The method of any of aspects 1 through 12, further comprising: transmitting the first set of network coding encoded packets to the UE comprising an initial redundancy overhead different from the identified redundancy overhead, wherein determining the failure rate is based at least in part on transmitting the first set of network coding encoded packets to the UE.

Aspect 14: The method of any of aspects 1 through 13, further comprising: transmitting a third set of network coding encoded packets to a second UE different from the UE, wherein the third set of network coding encoded packets comprises a second redundancy overhead different from the identified redundancy overhead.

Aspect 15: A method for wireless communication at a UE, comprising: receiving, from a base station, a first set of network coding encoded packets comprising a first redundancy overhead; determining a failure rate associated with the first set of network coding encoded packets; transmitting, to the base station, a message related to a second redundancy overhead based at least in part on the determined failure rate, wherein the second redundancy overhead is different from the first redundancy overhead; and receiving, from the base station and based at least in part on transmitting the message, one or more second sets of network coding encoded packets transmitted with the second redundancy overhead.

Aspect 16: The method of aspect 15, wherein transmitting the message related to the second redundancy overhead comprises: transmitting a request to update the first redundancy overhead to the second redundancy overhead for the one or more second sets of network coding encoded packets.

Aspect 17: The method of aspect 16, further comprising: identifying that the failure rate associated with the first set of network coding encoded packets exceeds a threshold failure rate, wherein transmitting the request to update the first redundancy overhead is based at least in part on the failure rate exceeding the threshold failure rate.

Aspect 18: The method of any of aspects 16 and 17, wherein transmitting the request to update the first redundancy overhead comprises: transmitting the request to update the first redundancy overhead periodically and in accordance with a periodicity for updating redundancy overheads.

Aspect 19: The method of any of aspects 16 through 18, further comprising: receiving, from the base station, a RRC message indicating one or more of a periodicity for updating redundancy overheads and a threshold failure rate associated with updating redundancy overheads, wherein the request to update the first redundancy overhead is in accordance with the RRC message.

Aspect 20: The method of any of aspects 15 through 19, wherein transmitting the message related to the second redundancy overhead comprises: transmitting the message via a MAC-CE or UCI.

Aspect 21: The method of any of aspects 15 through 20, wherein the message related to the second redundancy overhead comprises an indication of the failure rate associated with the first set of network coding encoded packets.

Aspect 22: The method of any of aspects 15 through 21, wherein determining the failure rate comprises: attempting to receive each of the first set of network coding encoded packets; and estimating the failure rate based at least in part on a quantity of the first set of network coding encoded packets that are successfully received when attempting to receive each of the first set of network coding encoded packets.

Aspect 23: The method of any of aspects 15 through 22, wherein determining the failure rate comprises: identifying a quantity of the first set of network coding encoded packets that are received via a RLC entity at the UE; and estimating the failure rate based at least in part on the quantity of the first set of network coding encoded packets that are received via the RLC entity.

Aspect 24: An apparatus for wireless communication at a base station, comprising a processor; memory coupled with the processor; and instructions stored in the memory and executable by the processor to cause the apparatus to perform a method of any of aspects 1 through 14.

Aspect 25: An apparatus for wireless communication at a base station, comprising at least one means for performing a method of any of aspects 1 through 14.

Aspect 26: A non-transitory computer-readable medium storing code for wireless communication at a base station, the code comprising instructions executable by a processor to perform a method of any of aspects 1 through 14.

Aspect 27: An apparatus for wireless communication at a UE, comprising a processor; memory coupled with the processor; and instructions stored in the memory and executable by the processor to cause the apparatus to perform a method of any of aspects 15 through 23.

Aspect 28: An apparatus for wireless communication at a UE, comprising at least one means for performing a method of any of aspects 15 through 23.

Aspect 29: A non-transitory computer-readable medium storing code for wireless communication at a UE, the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    attempting to receive each of a first set of network coding encoded packets, the first set of network coding encoded packets using a first redundancy overhead;
    estimating a failure rate based at least in part on a quantity of the first set of network coding encoded packets that are successfully received when attempting to receive each of the first set of network coding encoded packets;
    transmitting a message related to a second redundancy overhead based at least in part on the failure rate associated with the first set of network coding encoded packets exceeding a threshold failure rate, wherein the failure rate associated with the first set of network coding encoded packets using the first redundancy overhead is based at least in part on a quantity of network coding encoded packets, from the first set of network coding encoded packets, that the UE is unable to receive, wherein the second redundancy overhead is different from the first redundancy overhead, and wherein transmitting the message related to the second redundancy overhead is based at least in part on estimating the failure rate; and
    receiving, after transmitting the message, one or more second sets of network coding encoded packets transmitted with the second redundancy overhead.

2. The method of claim 1, wherein the message related to the second redundancy overhead is transmitted in a request to update the first redundancy overhead to the second redundancy overhead for the one or more second sets of network coding encoded packets.

3. The method of claim 2, wherein the request to update the first redundancy overhead is transmitted periodically and in accordance with a periodicity for updating redundancy overheads.

4. The method of claim 2, further comprising:
    receiving a radio resource control message indicating one or more of a periodicity for updating redundancy overheads and the threshold failure rate associated with updating redundancy overheads,
    wherein the request to update the first redundancy overhead is in accordance with the radio resource control message.

5. The method of claim 1, wherein the message related to the second redundancy overhead is transmitted via a medium access control-control element or uplink control information.

6. The method of claim 1, wherein the message related to the second redundancy overhead comprises an indication of the failure rate associated with the first set of network coding encoded packets.

7. The method of claim 1, further comprising:
    identifying a quantity of the first set of network coding encoded packets that are received via a radio link control entity at the UE; and
    estimating the failure rate based at least in part on the quantity of the first set of network coding encoded packets that are received via the radio link control entity,
    wherein transmitting the message related to the second redundancy overhead is based at least in part on estimating the failure rate.

8. An apparatus for wireless communication at a user equipment (UE), comprising:
    one or more processors;
    one or more memories coupled with the one or more processors; and
    instructions stored in the one or more memories and executable by the one or more processors to cause the apparatus to:
        attempt to receive each of a first set of network coding encoded packets, the first set of network coding encoded packets using a first redundancy overhead;
        estimate a failure rate based at least in part on a quantity of the first set of network coding encoded packets that are successfully received when attempting to receive each of the first set of network coding encoded packets;
        transmit a message related to a second redundancy overhead based at least in part on the failure rate associated with the first set of network coding encoded packets exceeding a threshold failure rate, wherein the failure rate associated with the first set of network coding encoded packets using the first redundancy overhead is based at least in part on a quantity of network coding encoded packets, from the first set of network coding encoded packets, that the UE is unable to receive, wherein the second redundancy overhead is different from the first redundancy overhead, and wherein transmission of the message related to the second redundancy overhead is based at least in part on the failure rate; and
receive, after transmission of the message, one or more second sets of network coding encoded packets transmitted with the second redundancy overhead.

9. The apparatus of claim 8, wherein the message related to the second redundancy overhead is transmitted in a request to update the first redundancy overhead to the second redundancy overhead for the one or more second sets of network coding encoded packets.

10. The apparatus of claim 9, wherein the request to update the first redundancy overhead is transmitted periodically and in accordance with a periodicity for updating redundancy overheads.

11. The apparatus of claim 9, wherein the instructions are further executable by the one or more processors to cause the apparatus to:
receive a radio resource control message indicating one or more of a periodicity for updating redundancy overheads and the threshold failure rate associated with updating redundancy overheads,
wherein the request to update the first redundancy overhead is in accordance with the radio resource control message.

12. The apparatus of claim 8, wherein the message related to the second redundancy overhead is transmitted via a medium access control-control element or uplink control information.

13. The apparatus of claim 8, wherein the message related to the second redundancy overhead comprises an indication of the failure rate associated with the first set of network coding encoded packets.

14. The apparatus of claim 8, wherein the instructions are further executable by the one or more processors to cause the apparatus to:
identify a quantity of the first set of network coding encoded packets that are received via a radio link control entity at the UE; and
estimate the failure rate based at least in part on the quantity of the first set of network coding encoded packets that are received via the radio link control entity,
wherein transmit the message related to the second redundancy overhead is based at least in part on estimating the failure rate.

15. An apparatus for wireless communication at a user equipment (UE), comprising:
means for attempting to receive each of a first set of network coding encoded packets, the first set of network coding encoded packets using a first redundancy overhead;
means for estimating a failure rate based at least in part on a quantity of the first set of network coding encoded packets that are successfully received when attempting to receive each of the first set of network coding encoded packets;
means for transmitting a message related to a second redundancy overhead based at least in part on the failure rate associated with the first set of network coding encoded packets exceeding a threshold failure rate, wherein the failure rate associated with the first set of network coding encoded packets using the first redundancy overhead is based at least in part on a quantity of network coding encoded packets, from the first set of network coding encoded packets, that the UE is unable to receive, wherein the second redundancy overhead is different from the first redundancy overhead, and wherein transmitting the message related to the second redundancy overhead is based at least in part on the failure rate; and
means for receiving, after transmission of the message, one or more second sets of network coding encoded packets transmitted with the second redundancy overhead.

16. The apparatus of claim 15, wherein the message related to the second redundancy overhead is transmitted in a request to update the first redundancy overhead to the second redundancy overhead for the one or more second sets of network coding encoded packets.

17. The apparatus of claim 16, wherein the request to update the first redundancy overhead is transmitted periodically and in accordance with a periodicity for updating redundancy overheads.

18. The apparatus of claim 16, further comprising:
means for receiving a radio resource control message indicating one or more of a periodicity for updating redundancy overheads and the threshold failure rate associated with updating redundancy overheads,
wherein the request to update the first redundancy overhead is in accordance with the radio resource control message.

19. The apparatus of claim 15, wherein the message related to the second redundancy overhead is transmitted via a medium access control-control element or uplink control information.

20. The apparatus of claim 15, wherein the message related to the second redundancy overhead comprises an indication of the failure rate associated with the first set of network coding encoded packets.

21. The apparatus of claim 15, further comprising:
means for identifying a quantity of the first set of network coding encoded packets that are received via a radio link control entity at the UE; and
means for estimating the failure rate based at least in part on the quantity of the first set of network coding encoded packets that are received via the radio link control entity,
wherein transmit the message related to the second redundancy overhead is based at least in part on estimating the failure rate.

22. A non-transitory computer-readable medium storing code for wireless communication at a user equipment (UE), the code comprising instructions executable by one or more processors to:
attempt to receive each of a first set of network coding encoded packets, the first set of network coding encoded packets using a first redundancy overhead;
estimate a failure rate based at least in part on a quantity of the first set of network coding encoded packets that are successfully received when attempting to receive each of the first set of network coding encoded packets;
transmit a message related to a second redundancy overhead based at least in part on the failure rate associated with the first set of network coding encoded packets exceeding a threshold failure rate, wherein the failure rate associated with the first set of network coding encoded packets using the first redundancy overhead is based at least in part on a quantity of network coding encoded packets, from the first set of network coding encoded packets, that the UE is unable to receive, wherein the second redundancy overhead is different from the first redundancy overhead, and wherein transmitting the message related to the second redundancy overhead is based at least in part on the failure rate; and receive, after transmission of the message, one or more second sets of network coding encoded packets transmitted with the second redundancy overhead.

23. The non-transitory computer-readable medium of claim 22, wherein the message related to the second redundancy overhead is transmitted in a request to update the first redundancy overhead to the second redundancy overhead for the one or more second sets of network coding encoded packets.

24. The non-transitory computer-readable medium of claim 23, wherein the request to update the first redundancy overhead is transmitted periodically and in accordance with a periodicity for updating redundancy overheads.

25. The non-transitory computer-readable medium of claim 23, wherein the instructions are further executable by the one or more processors to:
receive a radio resource control message indicating one or more of a periodicity for updating redundancy overheads and the threshold failure rate associated with updating redundancy overheads,
wherein the request to update the first redundancy overhead is in accordance with the radio resource control message.

26. The non-transitory computer-readable medium of claim 22, wherein the message related to the second redundancy overhead is transmitted via a medium access control-control element or uplink control information.

27. The non-transitory computer-readable medium of claim 22, wherein the message related to the second redundancy overhead comprises an indication of the failure rate associated with the first set of network coding encoded packets.

28. The non-transitory computer-readable medium of claim 22, wherein the instructions are further executable by the one or more processors to:
identify a quantity of the first set of network coding encoded packets that are received via a radio link control entity at the UE; and
estimate the failure rate based at least in part on the quantity of the first set of network coding encoded packets that are received via the radio link control entity,
wherein transmit the message related to the second redundancy overhead is based at least in part on estimating the failure rate.

\* \* \* \* \*